US012136226B2

(12) United States Patent
Feng et al.

(10) Patent No.: US 12,136,226 B2
(45) Date of Patent: *Nov. 5, 2024

(54) SYSTEMS, APPARATUS, AND METHODS FOR RETRIEVING IMAGE DATA OF IMAGE FRAMES

(71) Applicant: Waymo LLC, Mountain View, CA (US)

(72) Inventors: Jia Feng, Mountain View, CA (US); Damien Kelly, Mountain View, CA (US); Ignacio Garcia Dorado, Mountain View, CA (US); Xiaoying He, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,142

(22) Filed: Dec. 11, 2023

(65) Prior Publication Data

US 2024/0135551 A1    Apr. 25, 2024

Related U.S. Application Data

(63) Continuation of application No. 17/135,337, filed on Dec. 28, 2020, now Pat. No. 11,875,516.

(51) Int. Cl.
*G06T 7/223* (2017.01)
*G06T 1/60* (2006.01)
(Continued)

(52) U.S. Cl.
CPC ............. *G06T 7/223* (2017.01); *G06T 1/60* (2013.01); *G06T 7/33* (2017.01); *G06T 7/55* (2017.01);
(Continued)

(58) Field of Classification Search
CPC .. G06T 7/223; G06T 7/33; G06T 7/55; G06T 1/60; G06T 2207/20021;
(Continued)

(56) References Cited

U.S. PATENT DOCUMENTS 7,933,332 B2   4/2011   Schu et al.
9,167,132 B2   10/2015  Cho et al.
(Continued)

FOREIGN PATENT DOCUMENTS

CN          111027482 A     4/2020
KR   10-2010-0017645 A     2/2010
(Continued)

OTHER PUBLICATIONS

Ji-Hee Moon et al., "Efficient coding of motion vector predictor using phased-in code", Journal of Broadcase Engineering, 15(3), pp. 340-349, May 2010.
(Continued)

*Primary Examiner* — Casey L Kretzer
(74) *Attorney, Agent, or Firm* — McDonnell Boehnen Hulbert & Berghoff LLP

(57) ABSTRACT

Described examples relate to an apparatus comprising a memory for storing a sequence of image frames and at least one processor. The at least one processor may be configured to receive a first image frame of a sequence of image frames from an image capture device and select a first portion of a first image frame. The at least one processor may also be configured to obtain alignment information and determine a first portion and a second portion of a second image frame based on the alignment information. Further, the at least one processor may be configured to determine a bounding region within the second image frame and fetch image data corresponding to the bounding region of the second image frame from memory. In some examples, the first image frame may (Continued)

comprise a base image and the second image frame may comprise an alternative image frame. Further, the first image frame may comprise any one of the image frames of the sequence of image frames.

20 Claims, 16 Drawing Sheets

(51) Int. Cl.
  *G06T 7/33* (2017.01)
  *G06T 7/55* (2017.01)
  *G06V 10/44* (2022.01)
(52) U.S. Cl.
  CPC .. *G06V 10/443* (2022.01); *G06T 2207/20021* (2013.01); *G06T 2207/20221* (2013.01); *G06T 2207/30252* (2013.01)
(58) Field of Classification Search
  CPC ........... G06T 2207/20221; G06T 2207/30252; G06V 10/443
  See application file for complete search history.

(56) References Cited

U.S. PATENT DOCUMENTS

| | | | |
|---|---|---|---|
| 10,026,155 | B1 | 7/2018 | Furukawa |
| 10,218,998 | B2 | 2/2019 | Lee et al. |
| 10,291,931 | B2 | 5/2019 | Saeedi |
| 10,516,825 | B2 | 12/2019 | Ikeda et al. |
| 11,875,516 | B2 | 1/2024 | Feng et al. |
| 2005/0169378 | A1 | 8/2005 | Kim et al. |
| 2008/0025398 | A1 | 1/2008 | Molloy et al. |
| 2010/0098165 | A1 | 4/2010 | Farfade et al. |
| 2010/0231688 | A1 | 9/2010 | Park et al. |
| 2014/0010303 | A1 | 1/2014 | Hong et al. |
| 2019/0045089 | A1 | 2/2019 | Tanner et al. |
| 2020/0137415 | A1 | 4/2020 | Esenlik et al. |
| 2020/0227010 | A1 | 7/2020 | Holland et al. |
| 2020/0258240 | A1 | 8/2020 | Spampinato et al. |
| 2020/0349683 | A1 | 11/2020 | Allu et al. |
| 2022/0366574 | A1 | 11/2022 | Kawashima |

FOREIGN PATENT DOCUMENTS

| | | |
|---|---|---|
| KR | 10-2019-0115409 A | 10/2019 |
| WO | 2018211122 A1 | 11/2018 |

OTHER PUBLICATIONS

International Search Report and Written Opinion from International Application No. PCT/US2021/062018, dated Apr. 1, 2022.

B. Pesquet-Popescu et al., "Motion Estimation Techniques," Telecom ParisTech, 2016, retrieved from URL:https://mmnet.wp.imt.fr/files/2016/12/poly_me.pdf.

SYSTEMS, APPARATUS, AND METHODS FOR RETRIEVING IMAGE DATA OF IMAGE FRAMES

CROSS-REFERENCE TO RELATED APPLICATIONS

This application is a continuation of U.S. patent application Ser. No. 17/135,337, filed Dec. 28, 2020, which is incorporated herein by reference.

BACKGROUND

Autonomous vehicles may use various computing systems to aid in the transport of passengers from one location to another. Some autonomous vehicles may operate based on some initial input or continuous input from an operator, such as a pilot, driver, or passenger. Other systems, such as autopilot systems, may be used only when the system has been engaged, which permits the operator to switch from a manual mode (where the operator may exercise a high degree of control over the movement of the vehicle) to an autonomous mode (where the vehicle essentially drives itself) to modes that lie somewhere in between.

Such vehicles are typically equipped with various types of sensors in order to detect objects in the surrounding environment. For example, an autonomous vehicle may include lasers, sonar, radar, cameras, and other devices which scan and record data from the surroundings of the vehicle. The data from one or more of these devices may be used to detect the characteristics (position, shape, heading, speed, etc.) of a scene. For example, image data from an image capture device(s) (e.g., a camera or image sensor) may be used to determine movement of objects in the scene.

The image capture device(s) may capture a series of image frames of a scene. The image data representing the image frames may be divided into smaller regions, such as blocks, and the image data may be stored in an external memory. To perform image processing of the image frames, the image data associated with each block of the image frame may be fetched separately from the external memory on a block-by-block basis. However, separately fetching the image data associated with the image frames on a block-by-block basis may involve performing numerous read operations and may introduce bottlenecks. Such memory transfers may also consume a significant amount of memory bandwidth and may be computationally complex. Further, separately fetching the image data may reduce bus speed and may cause latencies for bus transactions. As a result, the retrieval of image data on a block-by-block basis may impact the performance of the computing systems of a vehicle.

SUMMARY

Systems, methods, and apparatus provide techniques for improving the efficiency of transferring image data from a memory during image processing. In one aspect, the present application describes a method. The method may comprise receiving a first image frame of a sequence of image frames from an image capture device and selecting a first portion of the first image frame. The method may also include obtaining alignment information (e.g., alignment map) and determining a first portion and a second portion of a second image frame based on the alignment information. Additionally, the method may include determining a bounding region within the second image frame and fetching image data corresponding to the bounding region of the second image frame from memory. In some examples, the first image frame may comprise a base or reference image and the second image frame may comprise an alternative image frame. Further, the first image frame may comprise any one of the image frames of the sequence of image frames.

In another aspect, the present application describes an apparatus comprising a memory for storing a sequence of image frames and at least one processor. The at least one processor may be configured to receive a first image frame of a sequence of image frames from an image capture device and select a first portion of a first image frame. The at least one processor may also be configured to obtain alignment information and determine a first portion and a second portion of a second image frame based on the alignment information. Further, the at least one processor may be configured to determine a bounding region within the second image frame and fetch image data corresponding to the bounding region of the second image frame from memory. In some examples, the first image frame may comprise a base or reference image and the second image frame may comprise an alternative image frame. Further, the first image frame may comprise any one of the image frames of the sequence of image frames.

In still another aspect, a non-transitory computer-readable medium storing instructions is disclosed that, when the instructions are executed by one or more processors, causes the one or more processors to perform operations. The operations may include receiving a first image frame of a sequence of image frames and selecting a first portion of a first image frame. The operations may also include obtaining alignment information and determining a first portion and a second portion of a second image frame based on the alignment information. Further, the operations may include determining a bounding region within the second image frame, and fetching, by the processor, image data corresponding to the bounding region of the second image frame from memory. In some examples, the first image frame may comprise a base or reference image and the second image frame may comprise an alternative image frame. Further, the first image frame may comprise any one of the image frames of the sequence of image frames.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
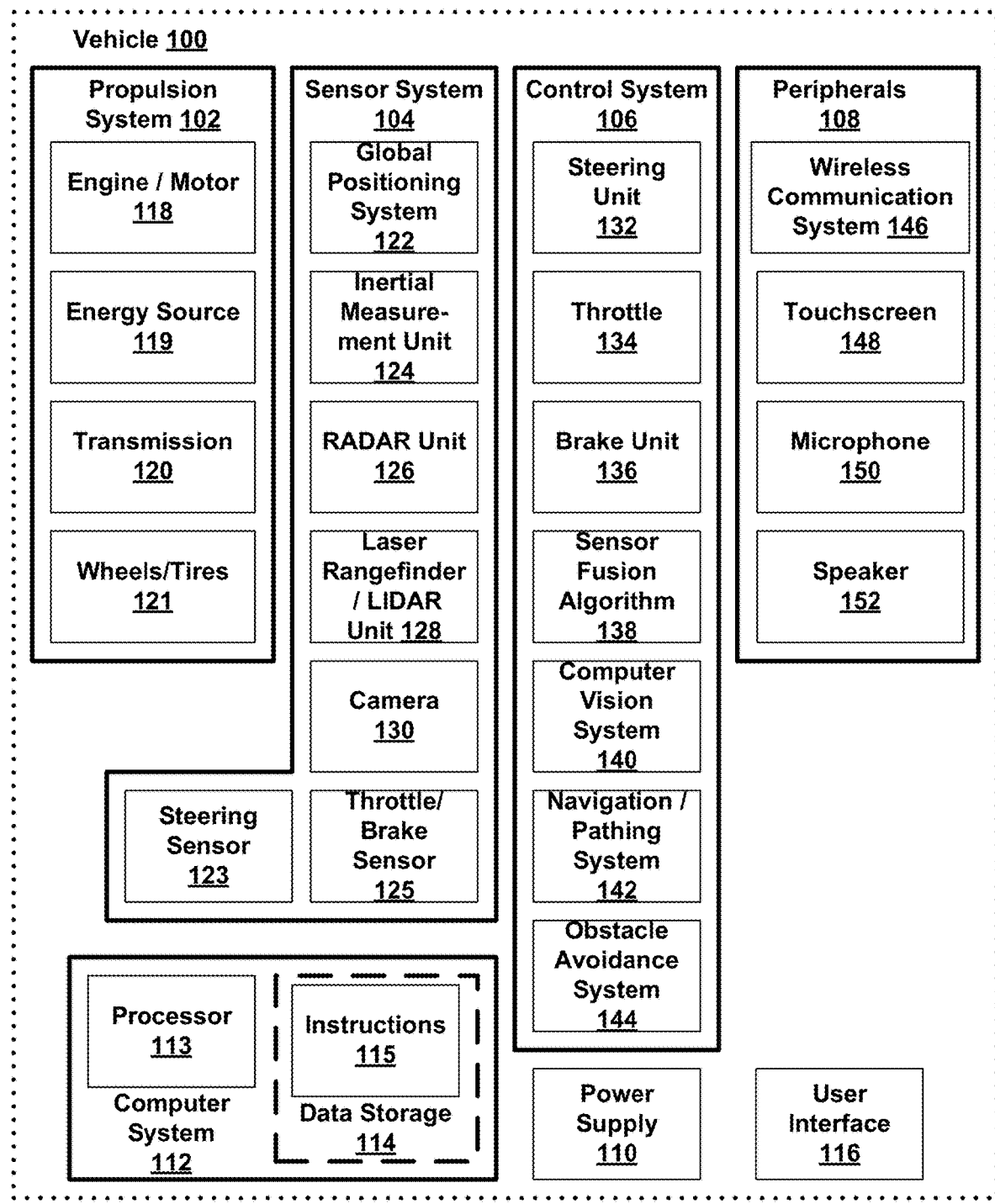
FIG. 1 is a functional block diagram illustrating systems of a vehicle, according to an example implementation.

Example systems, apparatus, and methods are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein.

Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

The present disclosure provides systems, apparatus, and methods that improve the functioning of computer systems of autonomous vehicles by enabling efficient memory access. The computing systems may implement image processing techniques to improve memory bandwidth utilization by reducing the complexity and the number of fetches of image data from an external memory. Rather than separately fetching portions of an image frame to combine with another image frame, the computing device may define an area in the image frame that includes one or more portions of the image frame to be fetched. The computing device may be configured to fetch the image data associated with the area during a fetch operation and combine the retrieved image data with another image frame.

Autonomous vehicles may navigate a path of travel without requiring a driver to provide guidance and control. In order to obey traffic regulations and avoid obstacles in the environment, the vehicle may utilize data provided by a vehicle sensor system equipped with one or multiple types of sensors. For example, the sensors may include light detection and ranging (lidar) sensors, radio detection and ranging (radar) sensors, sound navigation and ranging (sonar) sensors, image capture devices (e.g., cameras), microphone sensors, and other suitable sensors.

As the vehicle navigates, the sensors of the vehicle sensor system may be configured to capture sensor information (e.g., measurements) indicative of the vehicle's environment and provide the sensor information periodically or in a continuous manner to a computing device of the vehicle sensor system. The sensors may provide the sensor information in various formats to the computing device. For example, the computing device may receive the sensor information in the form of sensor data frames. Each of the sensor data frames may include one or multiple measurements of the environment captured at particular times during the operation of the sensors. Further, the sensors may provide multiple sensor data frames (e.g., a sequence or series of sensor frames) to the computing device as the vehicle operates, which may reflect changes in the environment.

The sensor system of the vehicle may include an image capture device (e.g., an image sensor or camera) configured to capture a sequence of image frames (e.g., images) of a scene. The image capture device may include a plurality of pixels or sensing elements configured in horizontal rows and/or vertical columns. The pixels of the image captured device may be sampled to obtain pixel values or image data for constructing an image or image frame. In some examples, the image capture device may have a rolling shutter configured to iteratively sample or scan the vertical columns and/or horizontal rows of the pixels. Once the image capture device captures the image data from the pixels, the image data may be stored in an external memory (e.g., "off chip" memory). The number of images captured by the image capture device and the arrangement of the exposure times used to capture the images may be referred to as a payload burst or a burst sequence.

The computing device of the sensor system may be configured to fetch the image data from the external memory. In some examples, the computing device may retrieve the image data associated with one or more image frames of the sequence of image frames from the external memory. The computing device may determine information about the environment using the image data of the image frames. Within the sequence of image frames, the initial image frame may include image data that corresponds to the environment at a first time period. Similarly, the second image frame of the sequence may include image data that corresponds to the environment at a second time period, which could be either after or before the first time period. Thus, each image frame may be indicative of the environment at a particular time period when the image capture device captures the image data associated with the image frame. Further, the image frames may include matching or similar information about the environment and/or may include other information depending on the amount of time that passes between the capture of the image data by the image capture device.

In some examples, image data of the image frames (e.g., images) of the sequence of image frames may be combined by the computing device into output or composite image frames (e.g., merged frames). For example, the computing device may combine or merge two or more image frames of the series of image frames into a single output image frame. Combining the image frames into an output image frame may improve the signal-to-noise ratio (SNR) of and achieve a higher dynamic range (HDR) within the resulting output image frame (e.g., a high dynamic range (HDR) image frame). The computing device may use the output image frame to make determinations about the location and identity of objects in the surrounding environment.

Combining the image data of the image frames to form output image frames may include performing one or more image processing techniques on the sequence of image frames (e.g., based on spatial or temporal information within the series of frames). The image processing techniques may include selecting a base or key image frame (e.g., a base image) from the sequence of image frames (e.g., images). In some examples, the base image frame may be selected from the image frames based on the capture or sampling times of the image capture device and/or the orientation of the image capture device. For example, the computing device may select the base image frame based on the image frame that is closest in time to a desired sample time. In other examples, the computing device may select the base image frame from the sequence of image frames by identifying the image frame with the greatest sharpness or the image frame that was captured during the least amount of motion (e.g., based on metadata associated with each of the image frames).

After the computing device selects the base image frame, the computing device may select one or more of the remaining image frames from the sequence of image frames to combine with the base image frame. The remaining image frames may be referred to as alternative or reference image frames (e.g., adjacent image frames). For example, the computing device may be configured to combine one or more portions of the base image frame with one or more portions of the alternative image frames. In order to combine image data from different image frames, the computing devices may perform an alignment process (e.g., a motion estimation process) to align image data of the base image frame with the image data of the alternative image frames. For example, the computing device may select image data associated with one or more portions of the base image frame and may determine corresponding image data of the alternative frames that substantially match or is similar to the image data associated with the base image frame.

In some implementations, the computing device may divide or partition the base image frame into a plurality of non-overlapping, equal-sized tiles or blocks. The computing device may select a tile of the base image frame and determine corresponding pixel-tile portions or areas (e.g., a tile or block size area) in an alternative image frame. The computing device may compare the image data associated with the selected tile of the base image frame to the image data associated with the tile-size portions of the alternative image frame. Based on the comparisons, the computing device may identify a portion (e.g., a matching patch or area) within the alternative image frame having substantially matching or similar image data as the image data associated with the selected tile of the base image frame. In some examples, the computing device may identify a number of candidate matching patches in the alternative image frame for the selected tile of the base image frame. The computing device may select one of the candidate matching patches to represent the most similar matching patch (e.g., the best matching patch) for the selected tile of the base image frame.

Once the most similar matching patch is identified in the alternative image frame, the computing device may generate alignment information (e.g., an alignment map) for the selected tile of the base image frame to identify or point to the matching patch in the alternative image frame. The alignment information may include a displacement or alignment vector. The displacement vector may be two-dimensional and may represent an offset between the matching patch and a tile of the alternative frame that is co-located (e.g., in same position) with the selected tile of the base image frame. The displacement vector may have a horizontal component value and a vertical component value. Further, the alignment information may include additional information (e.g., reliability, confidence of matching, repetition, etc.)

The computing device may associate the alignment information with the selected tile of the base image frame using image processing techniques. For example, the alignment information may be stored with the image data associated with the selected tile of the base image frame or in a list of alignment information. The computing device may determine alignment information for each tile of the base image frame that identifies a matching patch in one or more alternative frames and may store the alignment information.

The computing device may use the alignment information to fetch the image data associated with the matching patches in the alternative image frame. For example, the computing device may determine a location of a matching patch in the alternative image frame for a tile of the base image frame and may fetch the image data associated with the matching patch. The computing device may be configured to fetch the image data associated with each matching patch at different times during image processing operations. As a result, fetching image data from the external memory may be bandwidth-intensive and may become even more inefficient as the tile sizes of the base image frame decrease. For example, the tiles of a base image frame may have different alignment information (e.g., displacement vectors pointing in different directions) which may result from any number of factors including the position of the image capture device when the base image frame was captured versus when the alternative image frame was captured. As such, the matching patches corresponding to the tiles of the base image frame may be located in different portions of the alternative frame and may require the computing device to frequently fetch the image data from different portions of the alternative frame from the external memory.

In some examples, the computing device may define or select a region, such as a bounding region, in the alternative image that encompasses one or more matching patches. The bounding region may comprise a two-dimensional area having a pixel height and a pixel width. The computing device may be configured to fetch the image data associated with the bounding region including the one or more matching patches without performing separate fetches to retrieve the image data of each matching patch.

The computing device may determine the boundaries of the bounding region that encompass image data associated with one or more of the matching patches in the alternative image frame. For example, the computing device may determine a pixel width in the horizontal direction and/or a pixel height in the vertical component for the bounding region. The pixel width and/or the pixel height may be constrained or restricted by predetermined limits. The predetermined limits may represent a horizontal displacement limit and/or a vertical displacement limit within the alternative image frame.

Further, the computing device may use the location of one or more matching patches or the magnitude or orientation of the displacement vectors associated with the tiles of the base image frame to determine the dimensions of the bounding region. In one example, the computing device may define a boundary region within the alternative image frame based on the displacement vectors associated with tiles of the base image frame. For example, the computing device may determine differences between the displacement vectors associated with a plurality of tiles of the base image frame by comparing each of the displacement vectors. Based on the comparison, the computing device may select one or more of the displacement vectors that may be substantially similar. The computing device may identify the matching patches in the alternative image frame associated with the selected displacement vectors and may determine a boundary region within the alternative image frame that includes the matching patches. The computing device may be configured to fetch the image data associated with the boundary region in the alternative image frame that encompasses the matching patches.

In some examples, the computing device may define a boundary region within the alternative image frame based on alignment information that identifies a plurality of rows or columns of tiles of the alternative image frame. In other examples, the computing device may define the boundary region within the alternative image frame based on the proximity of the matching patches within the alternative image frame or the proximity of the tiles of the base image frame. For example, the computing device may define a boundary region encompassing matching patches located in the alternative image frame that are located in close proximity or in the same vicinity. The computing device may be configured to fetch the image data associated with the boundary region that includes the matching patches. As such, the computing device may fetch image data including multiple matching patches from the external memory during a single fetch operation. Thus, the complexity of transferring the image data of the matching patches may be reduced and memory bandwidth utilization may be improved.

Further, the computing device may generate addresses to access the external memory for transferring the image data associated with the bounding region to the computing device. The addresses may indicate a number of rows and columns associated with the bounding region. As such, the computing device may fetch the image data associated with the region from the external memory that includes the matching patches. In some examples, the bounding region may include the entire width or the height of the image frame. For example, the computing device may fetch image data associated with the entire width of the alternative image frame within a vertical range (e.g., upper and lower limits). In other examples, the computing device may fetch image data of the alternative image frame that includes the entire height of the image within a horizontal range (e.g., less than the width of the alternative image frame).

Once the computing device fetches the image data associated with the bounding region, the computing device may identify the image data associated with one or more matching patches of the alternate image frame and combine the image data with image data associated with a tile of the base image frame. Combining the image data of the alternative image frame with the base image frame using image processing techniques may improve the signal-to-noise ratio (SNR) of and achieve a high dynamic range within the resulting payload or output image frame (e.g., a high-dynamic range (HDR) image).

Example systems, apparatus, and methods that implement the techniques described herein will now be described in greater detail with reference to the figures. Generally, an example system may be implemented in or may take the form of a sensor or computer system of an automobile. However, a system may also be implemented in or take the form of other systems for vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating systems of an example vehicle 100, which may be configured to operate fully or partially in an autonomous mode. More specifically, the vehicle 100 may operate in an autonomous mode without human interaction through receiving control instructions from a computing system. As part of operating in the autonomous mode, the vehicle 100 may use one or more sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include various subsystems, such as a propulsion system 102, a sensor system 104, a control system 106, one or more peripherals 108, a power supply 110, a computer or computing system 112, a data storage 114, and a user interface 116. In other examples, the vehicle 100 may include more or fewer subsystems, which can each include multiple elements. The subsystems and components of the vehicle 100 may be interconnected in various ways. In addition, functions of the vehicle 100 described herein can be divided into additional functional or physical components, or combined into fewer functional or physical components within implementations. For instance, the control system 106 and computer system 112 may be combined into a single system that operates the vehicle 100 in accordance with various operations.

The propulsion system 102 may include one or more components operable to provide powered motion for the vehicle 100 and can include an engine/motor 118, an energy source 119, a transmission 120, and wheels/tires 121, among other possible components. For example, the engine/motor 118 may be configured to convert the energy source 119 into mechanical energy and can correspond to one or a combination of an internal combustion engine, an electric motor, steam engine, or Stirling engine, among other possible options. For instance, in some implementations, the propulsion system 102 may include multiple types of engines and/or motors, such as a gasoline engine and an electric motor.

The energy source 119 represents a source of energy that may, in full or in part, power one or more systems of the vehicle 100 (e.g., an engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other possible systems of the vehicle 100. As such, the transmission 120 may include a gearbox, a clutch, a differential, and a drive shaft, among other possible components. A drive shaft may include axles that connect to one or more of the wheels/tires 121.

The wheels/tires 121 of the vehicle 100 may have various configurations within example implementations. For instance, the vehicle 100 may exist in a unicycle, bicycle/motorcycle, tricycle, or car/truck four-wheel format, among other possible configurations. As such, the wheels/tires 121 may connect to the vehicle 100 in various ways and can exist in different materials, such as metal and rubber.

The sensor system 104 can include various types of sensors or sensor devices, such as a Global Positioning System (GPS) 122, an inertial measurement unit (IMU) 124, a radar 126, a laser rangefinder/lidar sensor 128, a camera 130, a steering sensor 123, and a throttle/brake sensor 125, among other possible sensors. In some implementations, the sensor system 104 may also include sensors configured to monitor internal systems of the vehicle 100 (e.g., 02 monitor, fuel gauge, engine oil temperature, brake wear).

The GPS 122 may include a transceiver operable to provide information regarding the position of vehicle 100 with respect to the Earth. The IMU 124 may have a configuration that uses one or more accelerometers and/or gyroscopes and may sense position and orientation changes of vehicle 100 based on inertial acceleration. For example, the IMU 124 may detect a pitch and yaw of the vehicle 100 while the vehicle 100 is stationary or in motion.

The radar 126 may represent one or more systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar unit or system configured to obtain measurements of the surrounding environment of the vehicle 100.

The laser rangefinder/lidar 128 may include one or more laser sources, a laser scanner, and one or more detectors or sensors, among other system components, and may operate in a coherent mode (e.g., using heterodyne detection) or in an incoherent detection mode. In some embodiments, the one or more detectors or sensor of the laser rangefinder/lidar 128 may include one or more photodetectors. In some examples, the photodetectors may be capable of detecting single photon avalanche diodes (SPAD). Further, such photodetectors can be arranged (e.g., through an electrical connection in series) into an array (e.g., as in a silicon photomultiplier (SiPM)).

The camera 130 may include one or more devices (e.g., a still camera or video camera) configured to capture images of the environment of the vehicle 100. In some examples, the camera may include an image sensor configured to capture a series of images (e.g., image frames) in a time-sequential manner. The image sensor may capture images at a particular rate or at a particular time interval between successive frame exposures.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of the wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of the vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of the vehicle 100. In other implementations, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate vehicle 100, which may involve using friction to decelerate the wheels/tires 121. In some implementations, brake unit 136 may convert kinetic energy of the wheels/tires 121 to electric current for subsequent use by a system or systems of the vehicle 100.

The sensor fusion algorithm 138 of the control system 106 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 of the control system 106 may include hardware and software operable to process and analyze images in an effort to determine objects, environmental objects (e.g., stop lights, road way boundaries, etc.), and obstacles. As such, the computer vision system 140 may use object recognition, Structure From Motion (SFM), video tracking, and other algorithms used in computer vision, for instance, to recognize objects, map an environment, track objects, estimate the speed of objects, etc.

The navigation/pathing system 142 of the control system 106 may determine a driving path for the vehicle 100, which may involve dynamically adjusting navigation during operation. As such, the navigation/pathing system 142 may use data from the sensor fusion algorithm 138, the GPS 122, and maps, among other sources to navigate the vehicle 100. The obstacle avoidance system 144 may evaluate potential obstacles based on sensor data and cause systems of the vehicle 100 to avoid or otherwise negotiate the potential obstacles.

As shown in FIG. 1, the vehicle 100 may also include peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of the vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

The vehicle 100 may include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

The vehicle 100 may also include the computer system 112 to perform operations, such as operations described therein. As such, the computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the implementation, the computer system 112 could be operable to monitor many aspects of the vehicle 100 and its subsystems. In some implementations, the computer system 112 may disable some or all functions of the vehicle 100 based on signals received from the sensor system 104.

The components of the vehicle 100 could be configured to work in an interconnected fashion with other components within or outside their respective systems. For instance, in an example implementation, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some implementations, the computer system 112 may make a determination about various objects based on data that is provided by systems other than the radio system. For example, the vehicle 100 may have lasers or other optical sensors configured to sense objects in a field of view of the sensors (e.g., vehicle). The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together.

The device elements that make up the vehicle 100 could be communicatively coupled together in a wired and/or wireless fashion.

Figure 2:
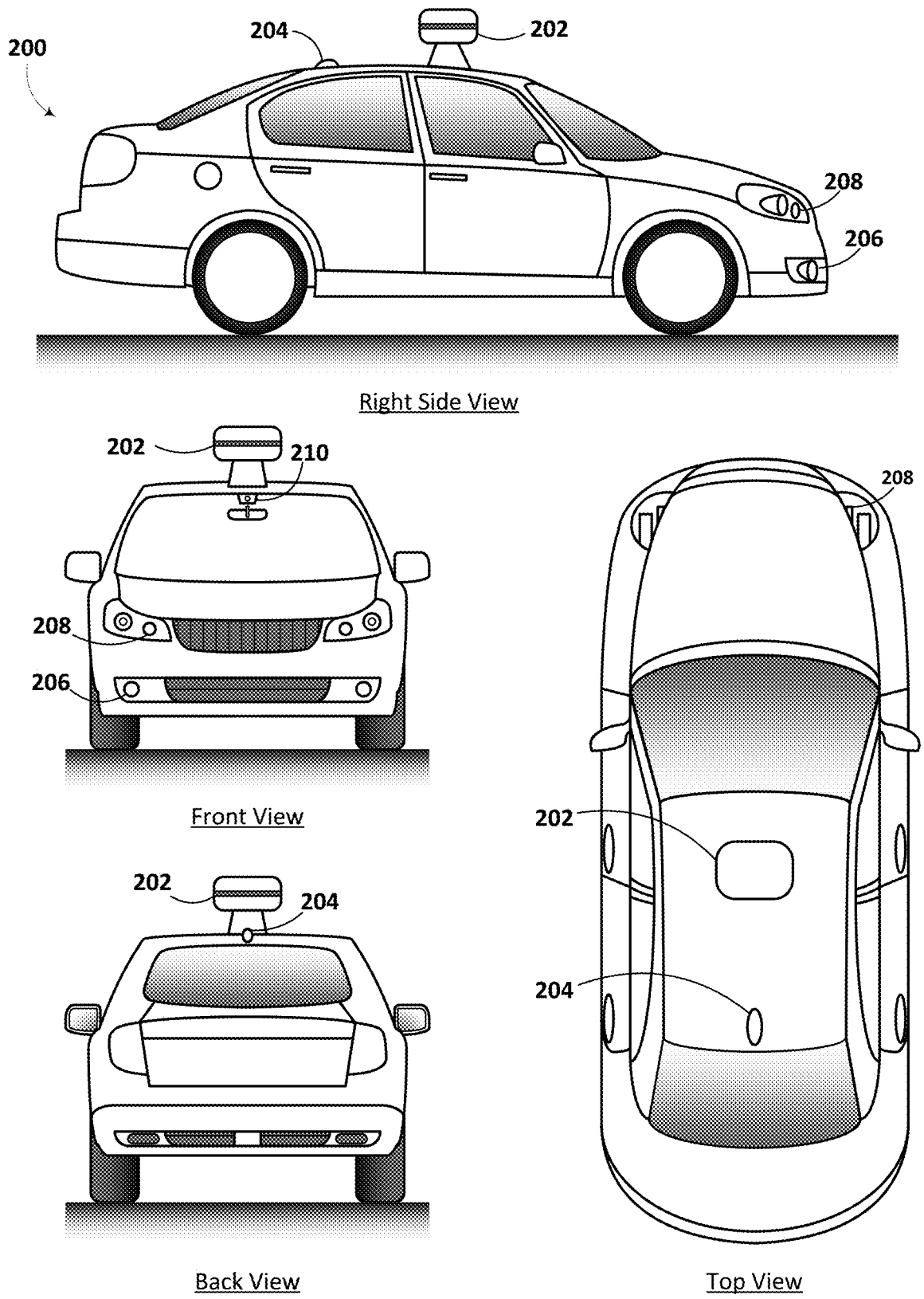
FIG. 2 is a conceptual illustration of a configuration of a vehicle, according to an example implementation.

FIG. 2 depicts an example physical configuration of the vehicle 200, which may represent one possible physical configuration of vehicle 100 described in reference to FIG. 1. Depending on the implementation, the vehicle 200 may include the sensor unit 202, the wireless communication system 204, the radio unit 206, the deflectors 208, and the camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors. In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be movable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3:
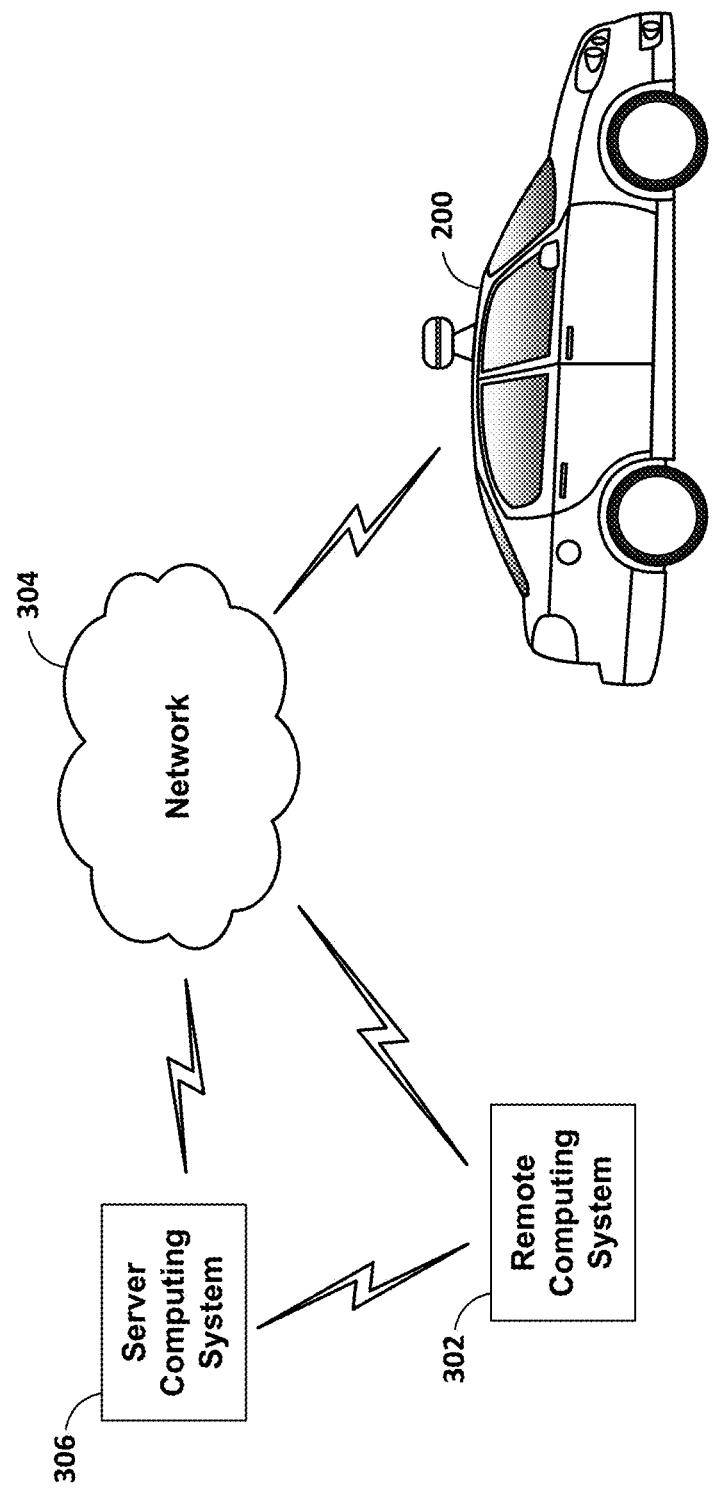
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between a remote computing system 302 and the vehicle 200 via a network 304. Wireless communication may also occur between a server computing system 306 and the remote computing system 302, and between the server computing system 306 and the vehicle 200.

The vehicle 200 can correspond to various types of vehicles capable of transporting passengers or objects between locations and may take the form of any one or more of the vehicles discussed above. In some instances, the vehicle 200 may operate in an autonomous mode that enables a control system to safely navigate the vehicle 200 between destinations using sensor measurements. When operating in an autonomous mode, the vehicle 200 may navigate with or without passengers. As a result, the vehicle 200 may pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to vehicle 200 or to other devices. The remote computing system 302 may take various forms, such as a workstation, a desktop computer, a laptop, a tablet, a mobile phone (e.g., a smart phone), and/or a server. In some examples, the remote computing system 302 may include multiple computing devices operating together in a network configuration.

The remote computing system 302 may include one or more subsystems and components similar or identical to the subsystems and components of vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The network 304 represents infrastructure that enables wireless communication between the remote computing system 302 and the vehicle 200. The network 304 also enables wireless communication between the server computing system 306 and the remote computing system 302, and between the server computing system 306 and the vehicle 200.

The position of the remote computing system 302 can vary within examples. For instance, the remote computing system 302 may have a remote position from the vehicle 200 that has a wireless communication via the network 304. In another example, the remote computing system 302 may correspond to a computing device within the vehicle 200 that is separate from the vehicle 200, but with which a human operator can interact while a passenger or driver of the vehicle 200. In some examples, the remote computing system 302 may be a computing device with a touchscreen operable by the passenger of the vehicle 200.

In some implementations, operations described herein that are performed by the remote computing system 302 may be additionally or alternatively performed by the vehicle 200 (i.e., by any system(s) or subsystem(s) of the vehicle 200). In other words, the vehicle 200 may be configured to provide a remote assistance mechanism with which a driver or passenger of the vehicle can interact.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200.

The various systems described above may perform various operations. For example, a computing or sensor system (e.g., the remote computing system 302, the server computing system 306, or a computing system local to the vehicle 200) may operate sensors or sensor devices to capture sensor information of the environment of an autonomous vehicle. In general, at least one computing device or system will be able to analyze the sensor information and possibly control the autonomous vehicle.

In some implementations, to facilitate autonomous operation, a vehicle (e.g., the vehicle 200) may receive data representing objects in an environment in which the vehicle operates (also referred to herein as "environment data") in a variety of ways. A sensor or computing system on the vehicle may provide the environment data representing objects of the environment. For example, the vehicle may have various sensors, including a camera, a radar sensor, a laser range finder/lidar sensor, an image sensor, a microphone, and other sensors. Each of these sensors may communicate data to a computing device (e.g., a processor) in the vehicle about information each respective sensor receives.

In some implementations, the computing device (e.g., a controller or processor) or computing system may be able to combine information from the various sensors in order to make further determinations of the environment of the vehicle. For example, the processing system may combine data from a lidar sensor or a radar sensor and an image sensor to determine if another vehicle or pedestrian is in front of the autonomous vehicle. In other implementations, other combinations of sensor data may be used by the computing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The computing or processing system of the vehicle may alter the control of the vehicle based on the environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this operation, the vehicle may analyze the environment data representing objects of the environment to determine at least one object having a detection confidence below a threshold. A computing device or processor in the vehicle may be configured to detect various objects of the environment based on environment data from various sensors. For example, in one implementation, the computing device may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some implementations, the environment data may be received from a camera and include image or video data. In other implementations, the environment data may be received from a lidar sensor. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
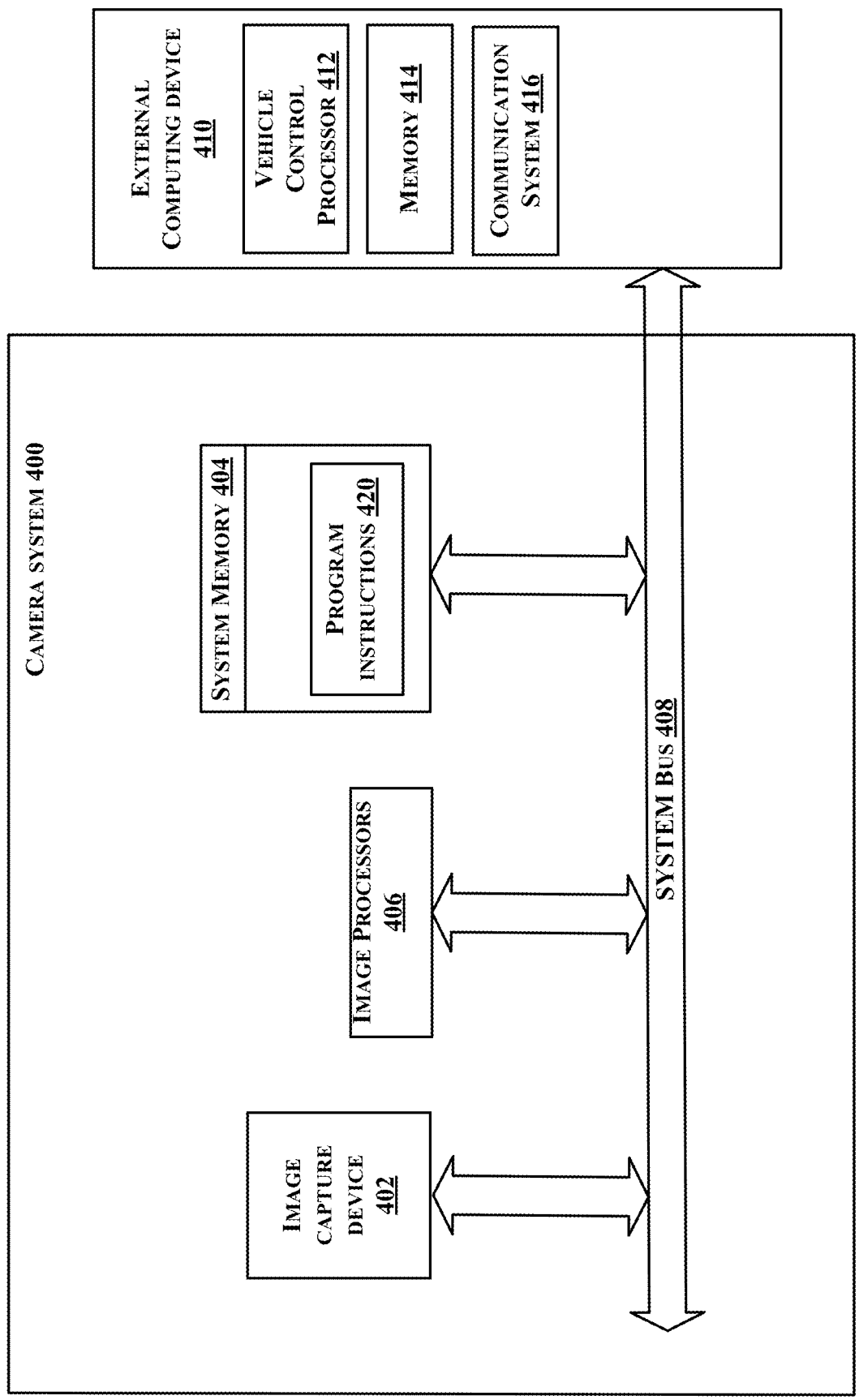
FIG. 4 is a simplified block diagram depicting components of a camera system, according to an example implementation.

FIG. 4 is a simplified block diagram depicting components of an example camera system 400 of a vehicle for capturing images. The camera system 400 may correspond to the camera system 130 of FIG. 1. In some examples, the vehicle may include more than one camera system. For example, the vehicle may include one camera system mounted to a top of the vehicle in a sensor dome and another camera system may be located behind the windshield of the vehicle. In other examples, the various camera systems may be located in various different positions throughout the vehicle.

As shown in FIG. 4, the camera system 400 may include an image capture device 402, a system memory 404, and a processor 406. The camera system 400 may be configured to capture image data and transmit the image data to the components and/or systems of the vehicle. In some implementations, the processor 406 may comprise multiple processors and the system memory 404 may or may not be located within the same physical housing as the processor 406. Although various components of camera system 400 are shown as distributed components, it should be understood that any of such components may be physically integrated and/or distributed according to a desired configuration of the camera system.

Further, the camera system 400 may include a system bus 408. Although depicted as a single bus, the system bus 408 may be composed of multiple buses. The system bus 408 may be implemented using any suitable communication technology and may include connection technology that allows multiple components to share the system bus 408. For example, the system bus 408 may be configured to enable the transfer of image frames (e.g., image data) between the image capture device 402, the system memory 404, and/or the processor 406. Further, the system bus 408 may communicatively couple the camera system 400 with an external computing device 410. For example, the system bus 408 may enable the image capture device 402 and/or the processor 406 to send image data to the external computing device 410.

The external computing device 410 may include a vehicle-control processor 412, a memory 414, a communication system 416, and other components. The external computing system 410 may be located in the autonomous vehicle. The communication system 416 of the external computing device 410 may be configured to communicate data between the vehicle and a remote device or computer server. The memory 414 of the external computing device 410 may have a larger capacity than the system memory 404 of the camera system 400. The memory 414 may also be used for longer term storage than the system memory 404. In some examples, image data received by the external computing device 410 may be used by a navigation system (e.g., a navigation processor) of the vehicle. Further, the external computing system 410 may be configured to control various operations of the camera system 400, among other options.

The image capture device 402 of the camera system 400 may be configured to capture image data and transfer the image data to the system memory 404 and/or processor 406. In some examples, the image capture device 402 may include a camera or an image sensor. The image capture device 402 may be implemented using any suitable image sensor technology, including a charge coupled device (CCD) or a complementary metal oxide semiconductor (CMOS) image sensor. The image capture device 402 may include pixel elements arranged in a two-dimensional (2D) grid or array to detect image data. In some implementations, the pixel element may be arranged in a three-dimensional (3D) array. When the pixel elements of the image capture device 402 are sampled, the values associated with each pixel element may be captured by the image capture device to generate an image frame (e.g., image). The image frame may be representative of a two-dimensional image of a scene. The image frame may include a plurality of pixels, and each pixel may correspond to a set of pixel values, such as depth values, photometric values (e.g., red-green-blue (RGB) values, intensity values, chroma values, saturation values, etc.), or a combination thereof.

The image capture device 402 may be configured to capture a burst of a sequence of image frames across a range of exposure times (e.g., a payload burst). The burst of images frames can be used to determine the characteristics of the scene so that parameters for a subsequent burst sequence for capturing additional image frames can be selected. For example, the image capture device 402 may capture a burst of image frames (e.g., images) of a scene using fixed exposure time periods. In other examples, the burst of image frames may be captured by the image capture device 402 using different or variable exposure time periods. The burst of image frames captured by the image capture device 402 may be stored in external memory, such as the system memory 404, for further processing.

The system memory 404 of the camera system 400 may store information including image data that may be retrieved, manipulated, and/or stored by the processor 406. The system memory 404 may be larger than the internal memory included in the processor 406 and may act as the main memory for the camera system 400. In some examples, the system memory 404 may be located outside of or external to an integrated circuit (IC) containing the processor 406. The system memory 404 may be referred to as "off-chip" memory. The system memory 404 may comprise any type of volatile or non-volatile memory technology, such as dynamic random access memory (DRAM), synchronous dynamic random access memory (SDRAM), or Flash memory.

The system memory 404 may also be implemented as electrically erasable programmable read only memory (EEPROM) or another non-volatile or volatile memory type. In some examples, the system memory 404 may be a memory cache or buffer to temporarily store image data. In some implementations, the system memory 404 may be part of the image captured device 402. Further, the system memory 404 may include program instructions 420 that are executable by the processor 406 to facilitate the various functions described herein. For example, image compression and motion estimation algorithms may be stored in the system memory 404 and executed by the processor 406.

The processor 406 of the camera system 400 may be communicatively coupled to the image capture device 402 and the system memory 404. The processor 406 may include any type of processor including, but not limited to, a microprocessor, a microcontroller, a digital signal processor (DSP), an image processor, or any combination thereof. The processor 406 may operate based on instructions, control information from registers, or both. The processor 406 may perform image processing functions on image data captured by the image capture device 402, such as image enhancement (e.g., noise reduction), image stabilization (e.g., to compensate for movement of a camera), and object recognition (e.g., finding a specific object in two or more images), as well as other functions. In addition, the processor 406 may apply any of a number of data reduction techniques to the image data, such as redundancy avoidance, lossless compression, and lossy compression.

The processor 406 may be configured to receive image data from the image capture device 402 and combine the image data using various image processing techniques. For example, the processor 406 may receive a burst of image frames (e.g., a sequence of images) from the image capture device 402 and may store the image frames in an external memory, such as the system memory 404 or memory coupled to or included in the processor 406. Further, the processor 406 may also be configured to fetch or retrieve the image data associated with the image frames from the external memory as well as modify the image frames.

Figure 5:
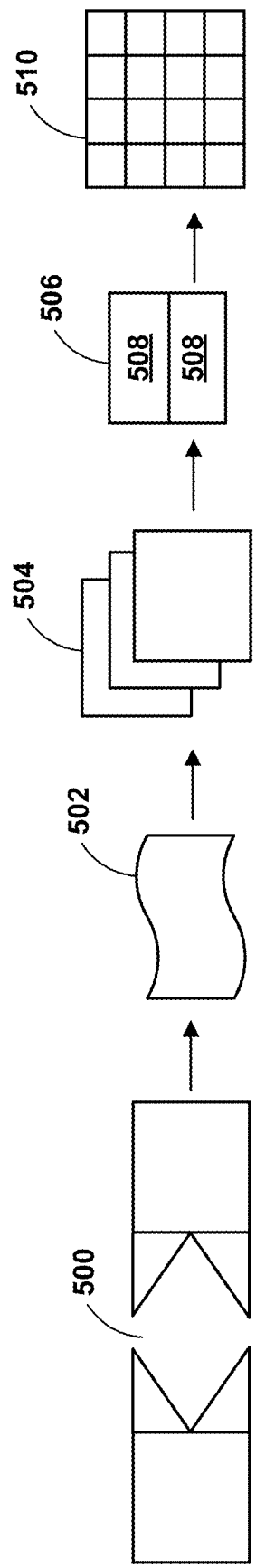
FIG. 5 is a conceptual illustration of a sequence of image frames, according to an example implementation.

The processor 406 may be configured to partition or divide the image data associated with the image frames into a number of regions (e.g., tiles or blocks) and perform image processing operations (e.g., motion estimation) on one or more of the regions. For example, the processor 406 may receive an image stream 500 as shown in FIG. 5. The image stream 500 may include a sequence or series of images or image frames 502. The sequence 502 may include a number of temporally adjacent image frames 504. While three frames are depicted as adjacent image frames 504, the sequence 502 can include any number of adjacent image frames 504.

The processor 406 may subdivide each of the adjacent image frames 504 into individual frames, for example, a single image frame 506. Further, the processor 406 may divide or partition the single image frame 506 into a series of segments or planes 508. The segments (or planes) 508 may be subsets of image frames that permit parallel processing, for example. The segments 508 may also be subsets of image frames that separate the image data into different color components. For example, an image frame 506 of image data can include a luminance plane and two chrominance planes. The segments 508 may be sampled at different resolutions.

Further, the processor 406 may divide or partition the image frame 506 into equal-size tiles or blocks 510. Each tile may include a plurality of pixels, and each pixel may correspond to a set of pixel values, such as depth values, photometric values (e.g., red-green-blue (RGB) values, intensity values, chroma values, saturation values, etc.), or a combination thereof. The tiles may have dimensions of 16×16 pixels or 8×8 pixels. Further, the tiles may have a square or rectangular shape and may have a pixel height and pixel width. The tiles 510 may also be arranged to include image data from one or more planes of pixel values or data. In other examples, the tiles 510 may be of any other suitable size such as 4×4 pixels, 8×8 pixels, 16×8 pixels, 8×16 pixels, 16×16 pixels or larger. The processor 406 may store the image frames of the sequence in the tiled or block format in the internal memory of the processor 406 or in the system memory, such as the system memory 404, for further processing. In some examples, groups of tiles from the same or different image frames may be processed in parallel using multiple processors.

Figure 6:
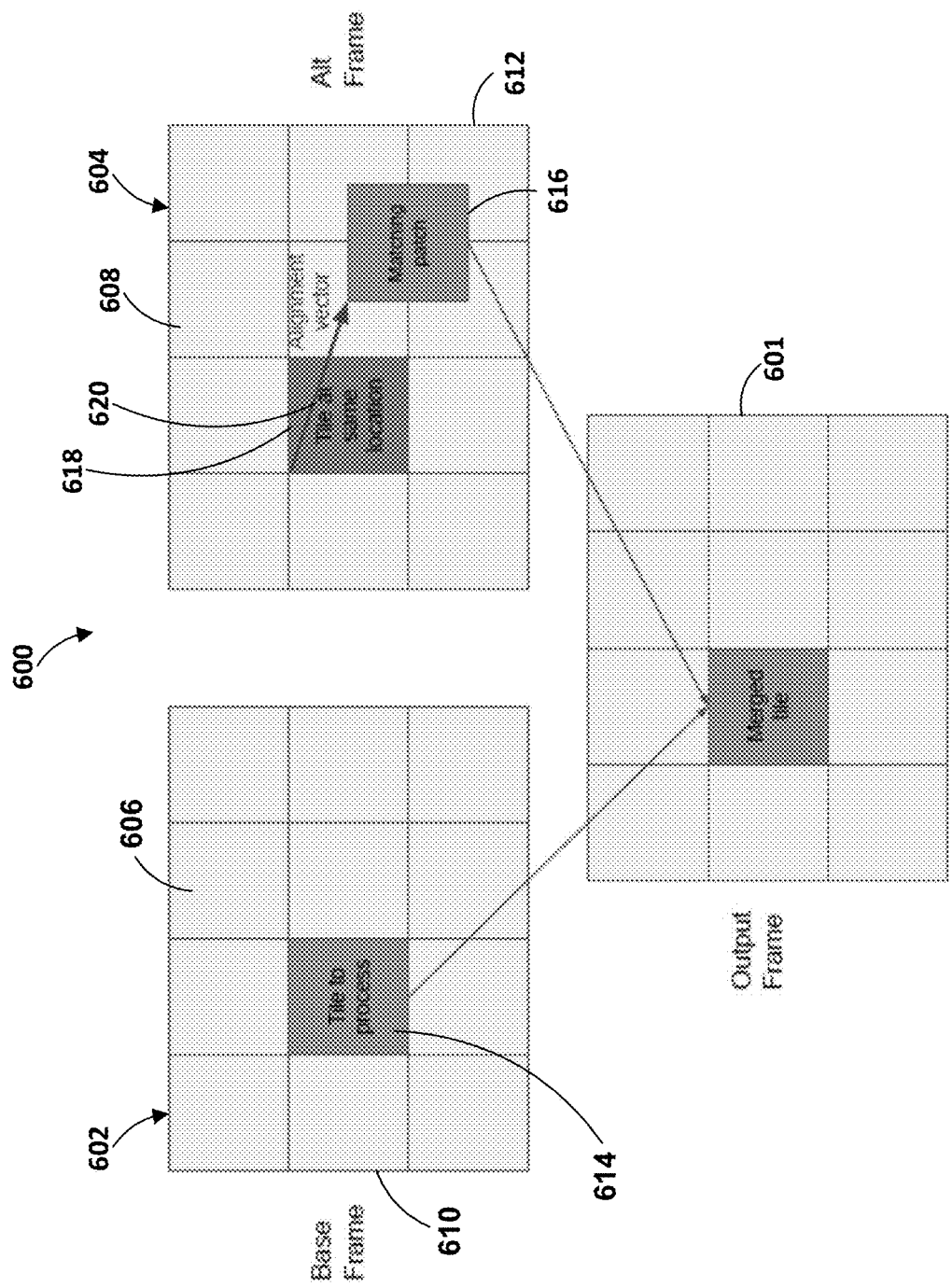
FIG. 6 is a conceptual illustration of merging portions of image frames to form an output image frame, according to an example implementation.

FIG. 6 is a conceptual illustration of merging portions of image frames of a sequence or series of image frames 600 to form an output image frame 601 (e.g., a merged image frame). The sequence of image frames 600 may be captured of a scene during a burst sequence or payload burst. The sequence of image frames 600 may be similar to the image frames described in reference to FIG. 5. As shown in FIG. 6, the sequence of image frames 600 includes a first image frame 602 and a second image frame 604. The first image frame 602 may be captured prior or later in time than the second image frame 604. For example, the first image frame 602 may be an image frame that is captured immediately before the second image frame 604, in which case the first image frame 602 and the second image frame 604 are consecutive image frames in the sequence of image frames 600. In other examples, the first image frame 602 and the second image frame 604 may not be consecutive frames, but instead may be further spaced apart in time and have one or more frames between them.

The first and second image frames 602 and 604 of the sequence of image frames 600 may be received by a processor, such as the processor 406 of FIG. 4, for image processing. The processor may operate based on instructions, control information from registers, or both. The processor may be configured to combine one or more portions of the first image frame 602 with portions of the second image frame 604 to form the output or combined image frame 601. As shown in FIG. 6, the processor may divide the first image frame 602 into a number of square or rectangular tiles 606. Each of the tiles 606 represents a portion of the first image frame 602 and contains a number of pixels (e.g., image data). The processor may also divide the second image frame 604 into a number of square or rectangular tiles 608. For convenience and ease of understanding, each of the first and second image frames 602 and 604 may be divided into a 4×3 array of non-overlapping tiles having substantially the same shape and size. Each of the tiles 608 of the second image frame 604 may be co-located with a corresponding tile in the first image frame 602. For example, a co-located tile of the second image frame 604 may have the same coordinates, size, and shape as a corresponding tile of the first image frame 602. In other embodiments, the first and second image frames 602 and 604 may include any number of tiles and each tile may include any number of pixels. Further, the tiles of the first and second image frame 602 and 604 may have other shapes. Therefore, the present example is not limited in the number, size, and/or shape of the tiles that may be included in the first and second image frames 602 and 604 of the sequence of image frames.

The processor may select one or more image frames from the sequence of image frames 600 as base or key image frames. Further, the processor may select one or more of the remaining image frames as alternative or reference frames to combine with the base image frame. The alternative image frame may occur temporally before or after the base image frame (e.g., an adjacent image frame). As shown in FIG. 6, the processor may select the first image frame 602 as the base image frame 610 and may select the second image frame 604 as an alternative image frame 612.

The processor may be configured to select the base image frame 610 based on a sharpness level (e.g., greatest sharpness). The sharpness level of an image frame may be measured by the resolution of the image frame and/or boundaries between zones of different tones and/or colors in the image frame. Alternatively or additionally, other sharpness measurements may be used. In some implementations, the processor may select the base image frame 610 based on the amount of motion of the image capture device capturing the sequence of image frames (e.g., based on metadata associated with each of the image frames).

In other examples, the base image frame 610 may be selected by the processor based on the exposure time period used to capture the base image frame 610. For example, the image capture device may use different or variable exposure time periods (e.g., capture time periods) to capture each image frame of the sequence of image frames 600. The processor may select the base image frame 610 from the sequence of images that was captured using the smallest exposure time period. In some examples, the processor may select the base image frame 610 based on the image frame that is nearest (e.g., closest) in time to the beginning of the burst of the image frames.

Once the processor selects the base image frame 610 from the sequence of image frames 600, the processor may use motion estimation techniques to identify changes in the image data that occur between the base image frame 610 and the alternative image frame 612 (e.g., adjacent or temporal image frame). For example, the image data associated with the image frames of the sequence of image frames may change from image frame to image frame due to movement of objects in the scene (e.g., a moving pedestrian) and/or movement of the image capture device (e.g., panning, tilt, zoom, rotation etc.) capturing the scene. The processor may be configured to determine movement of the image data between the base image frame 610 and the alternative image frame 612 and align the image data associated with the base image frame 610 with corresponding image data (e.g., matching or similar image data) associated with the alternative image frame 612. For example, the processor may align the image data associated with one or more tiles of the base image frame 610 with corresponding image data associated with the alternative image frame 612.

To align the image data associated with the base image frame 610 with the corresponding image data associated with the alternative image frame 612, the processor may perform a matching process to find and identify image data associated with the alternative image frame 612 that is most similar to the image data associated with the tiles of the base image frame 610. For example, the processor may be configured to perform a pixel-by-pixel comparison of the pixels (e.g., pixel value or image data) associated with the alternative image frames with respect to the pixels associated with a tile of the base image frame 610. The processor may perform the pixel-by-pixel comparison to determine a matching error (e.g., a difference) between the pixels, as further described below. The pixel-by-pixel comparison may include a comparison between the values of the pixels (e.g., depth values, photometric values (e.g., red-green-blue (RGB) values), or a combination thereof) of the alternative image frame 612 and the values of the pixels of tiles of the base image frame 610.

As shown in FIG. 6, the processor may select a tile 614 of the base image frame 610 and may perform a search of the image data associated with the alternative image frame 612 to identify tile-size areas, which may or may not be co-located or aligned with the tile 614 of the base image frame 610. More particularly, the processor may perform a full search of all of the image data associated with the alternative image frame 612 to identify one or more tile-size areas having similar or matching image data as the image data associated with the tile 614 of the base image frame 610. In some embodiments, the processor may search a particular area in the alternative image frame 612 to find similar or matching tile-size areas in the alternative image frame 612.

The size of the search area may depend on image resolution (e.g., format), frame rate, and the type of application. In some embodiments, the search area may have a rectangular shape that includes a portion of the image data associated with the alternative image frame 612.

After identifying one or more tile-size areas in the alternative image frame 612, the processor may be configured to compare the image data associated with the identified tile-size areas to the image data associated with the tile 614 of the base image frame 610. The processor may calculate a matching error (e.g., a difference) between the image data associated with the tile 614 of the base image frame 610 and the image data associated with each identified tile-sized areas of the alternative image frame 612. The matching error may be a numerical representation of similarity of the image data associated with the tile 614 of the base image frame 610 to the image data associated with a tile-size area of the alternative image frame 612. For example, the numerical representation may be a number of similar pixels divided by a total number of pixels Pixels associated with a tile of the base image frame 610 and a tile-sized area in the alternative frame 612 may be determined to be similar when the pixels exactly match (e.g., have the same numeric value for a particular pixel) or when the pixels substantially match (e.g., the numerical value of a first pixel is within a difference threshold value of a corresponding numerical value of a second pixel). In an alternative embodiment, the matching error may be a numerical representation of dissimilarity between the image data associated with a tile of the base image frame 610 and the image data associated with a tile-sized area of an alternative image frame 612. For example, the matching error may be a number of "dissimilar" pixels (e.g., pixels that are not similar as described above) divided by the total number of pixels.

The processor may perform any one of a number of algorithms to calculate the matching error between the image data associated with the alternative image frame 612 and the image data associated with the base image frame 610. For example, the processor may compute the sum of absolute differences (SAD), the sum of squared differences (SSD), the sum of absolute transform differences (SATD), the mean squared differences (MSD), Lucus-Kandae estimations, deep learning methods, loss functions, or other difference calculations between the image data associated with the tile 614 of the base image frame 610 and the image data associated with a tile-size area of the alternative image frame 612.

In some examples, the processor may compare the matching error between the image data associated with the base image frame 610 and alternative image frame 612 to a threshold value. When the comparison of the matching error to the threshold value indicates that the image data associated with the tile 612 of the base image frame 610 and the image data associated with a tile-size area of the alternative image frame 612 are substantially similar, the processor may selected the tile-size area as a candidate matching patch for merging with the image data associated with the tile 614 of the base image frame 610. For example, if the matching error is smaller than and/or equal to a threshold value (e.g., indicating that the image data is substantially similar), the processor may identify the tile-size area as a candidate matching patch. The threshold may be based on user input or a predetermined value.

Once the processor determines the candidate matching patches, the processor may select the candidate matching patch that is most similar to the image data associated with the tile 614 of the base image frame 610 as a matching patch ("best-matching patch"). For example, the candidate matching patch that has the smallest matching error (e.g., minimum match error) may be selected as the matching patch. As shown in FIG. 6, the processor may identify and select a tile-size area in the alternative image frame 612 as the matching patch 616. The processor may merge the image data associated with the selected matching patch 616 with the image data associated with the tile 614 of the base image frame 610 as further described below. The process for selecting a matching patch for a tile of the base image frame 610 may be performed for all of the tiles of the base image frame 610. In some examples, the matching process may be performed for less than all of the tiles of the base image frame 610.

Once matching patches are identified in the alternative image frame 612 for one or more tiles in the base image frame 610, the processor may generate alignment information or an alignment map. The alignment information may include one or more displacement or offset vectors for each tile in the base image frame 610 that identifies the corresponding matching patch. The displacement vectors 620 may include a horizontal component value (e.g., horizontal offset) and a vertical component value (e.g., a vertical offset). The alignment information may also include a resolution for the displacement vector, a location of a co-located tile in an alternative image frame, a direction that identifies whether the alternative image frame is before or after the base image frame, a horizontal pixel range (e.g., pixel width), a vertical pixel range, (e.g., pixel height) and/or a combination thereof.

Each displacement vector may identify a different matching patch in the alternative image frame 612. For example, the displacement vector for one or more tiles of the base image frame 610 may identify a tile in the alternative image frame 612 and the location of the matching patch in the alternative image frame 612. The displacement vectors may be two-dimensional and may represent a displacement or offset between the matching patch and a tile of the alternative image frame 610. The tile of the alternative image frame may be co-located (e.g., in the same position) with a selected tile of the base image frame 610. The co-located tile of the alternative image frame 612 may have the same coordinates, size, and shape as the selected tile of the base image frame 610.

As shown in FIG. 6, the processor may identify a tile 618 in the alternative image frame 612 that has the same location or position (e.g., co-located tile) as the selected tile 614 in the base image frame 610 and may generate a displacement vector 620 from the co-located tile 618 to the corresponding matching patch 616 in the alternative image frame 612. The displacement vector 620 may identify the matching patch 616 in the alternative image frame 612 that is offset from the tile 618 in the alternative image frame 612. The tile 618 of the alternative image frame 612 may be co-located with the selected tile 614 of the base image frame 610. As shown in FIG. 6, the displacement vector 620 extends from a pixel in the upper left hand corner of the co-located tile 618 with the head of the arrow pointing to a pixel in the upper left hand corner of the matching patch 616. In other embodiments, the displacement vector 620 may extend from a pixel in the center of the co-located tile of the alternative image frame 612 to a pixel in the center of the matching patch 616, or the displacement vector 620 could be defined in other ways. The displacement vector 620 may include a horizontal component value and a vertical component value. For example, the displacement vector 620 may include a row value and a column value (e.g., (Vx,Vy)).

Once the processor determines the displacement vector 620 for the selected tile 614 of the base image frame 610, the processor may associate the displacement vector 620 with the tile 614 of the base image frame 620 using image processing techniques (e.g., coding). For example, the displacement vector 620 may be stored with the image data of the selected tile 614 of the base image frame 610 or in a list of displacement vectors. The processor may use the displacement vector 620 to fetch the image data associated with the matching patch 616 for the selected tile 614 of the base image frame 610 from the external memory.

Once the image data associated with the matching patch 616 is retrieved from the external memory, the processor may use various image processing techniques to combine or merge the image data associated with the selected tile 614 of the base image frame 610 with the image data associated with the matching patch 616 to form the combined or output image frame 601. For example, the processor may receive the base image frame 610 and may obtain the displacement vectors associated with one or more tiles of the base image frame 610. The processor may use the displacement vectors associated with the tiles of the base image frame 610 to fetch the image data associated with the matching patches in the alternative image frame 612. Once the processor receives the image data associated with the matching patches of the alternative image frame 612, the processor may merge or combine the image data of the image frames to form output image frames (e.g., enhanced images). In some examples, different alternative image frames may be merged with a base image frame in parallel using multiple processors.

As shown in FIG. 6, the processor may be configured to combine the image data associated with tile 614 of the base image frame 610 with the image data associated with the matching patch 616 of the alternative image frame 612 to form the output image frame 601 (e.g., an enhanced image). The image data associated with the matching patch 616 of the alternative image frame 612 may be merged with the image data associated with the base image frame 610 using any suitable image fusion technique, such as Exposure Fusion that blends multiple exposures of the same scene into a single image. As such, one or more of the alternative image frames of the sequence of image frames 600 may be merged or synthesized into one or more base image frames to form output image frames (e.g., payload images) or a series of output image frames. The output image frames may have improved characteristics over the individual image frames of the sequence of image frames. For example, the output image frames may have a greater resolution, a higher dynamic range, a larger depth of field, less noise, a higher sharpness level, and/or less blurring than any of the image frames in the image frame sequence.

When fetching the matching patches in the alternative image frame 612 to combine with the image data associated with the tiles of the base image frame 610, the processor may use displacement vectors to identify the matching patches of the alternative image frame 612. The processor may separately fetch the image data associated with each matching patch of the alternative image frame 612 from the external memory. Using separate memory fetches to retrieve the image data associated with the matching patches may be bandwidth-intensive. For example, the tiles of a base image frame may include different displacement vectors (e.g., displacement vectors pointing in different directions) which may result from any number of factors including the position of the image capture device when the base image frame was captured versus when the alternative image frame was captured.

Further, the matching patches identified by the displacement vectors may be located in different locations in the alternative frame, which may require the processor to frequently fetch the image data from different portions of the alternative image frame from the external memory. The image data associated with the matching patches may also overlap which may result in inefficiency, since some of the same image data may be fetched several times for the tiles of the base image frame. In addition, although the inclusion of more tiles (e.g., smaller tiles) may result in greater resolution of image frames, it may require significantly more data fetching due to the smaller amount of image data retrieved during a fetch operation.

In some examples, rather than separately fetching the image data associated with each matching patch, the processor may define a two-dimensional bounding region or area that includes image data associated with an alternative image frame to be retrieved from external memory. For example, the bounding region may be limited within a specific range in the alternative image frame. The bounding region may have a pixel height and a pixel width that encompasses one or more of the matching patches in the alternative image frame. Each matching patch includes image data that corresponds to (e.g., matches) the image data associated 5o with a tile of a base image frame. In some examples, the bounding region may include the entire width or height of the alternative image frame.

Once the bounding region is determined, the processor may be configured to generate a vector that identifies the bounding region in the alternative image frame. The processor may use the vector to fetch the image data associated with the bounding region in a single data transfer (e.g., without performing separate fetches to retrieve the image data for each of the matching patches located within the bounding region). By decreasing the number of fetches to transfer the image data of the matching patches from external memory, the latency for retrieving image data may be reduced and the utilization of memory bandwidth may be improved. Further, the processor can access and retrieve image data associated with the bounding area without having to perform a high number of address calculations to fetch the image data for each matching patch. In addition, the amount of data retrieved during each fetch can be increased, which improves the overall bandwidth utilization by reducing the number of small transfers.

The processor may generate addresses to access the external memory for transferring the image data associated with the bounding region to the processor. The addresses may indicate a number of rows and columns associated with the bounding region. As such, the processor may fetch the image data associated with the bounding region from the external memory that includes the matching patches. In some examples, the processor may fetch image data associated with the entire width of the alternative image frame within a vertical range (e.g., upper and lower limits). In other examples, the processor may fetch image data of the alternative image frame that includes the entire height of the image within a horizontal range (e.g., less than the width of the alternative image frame).

Figure 7:
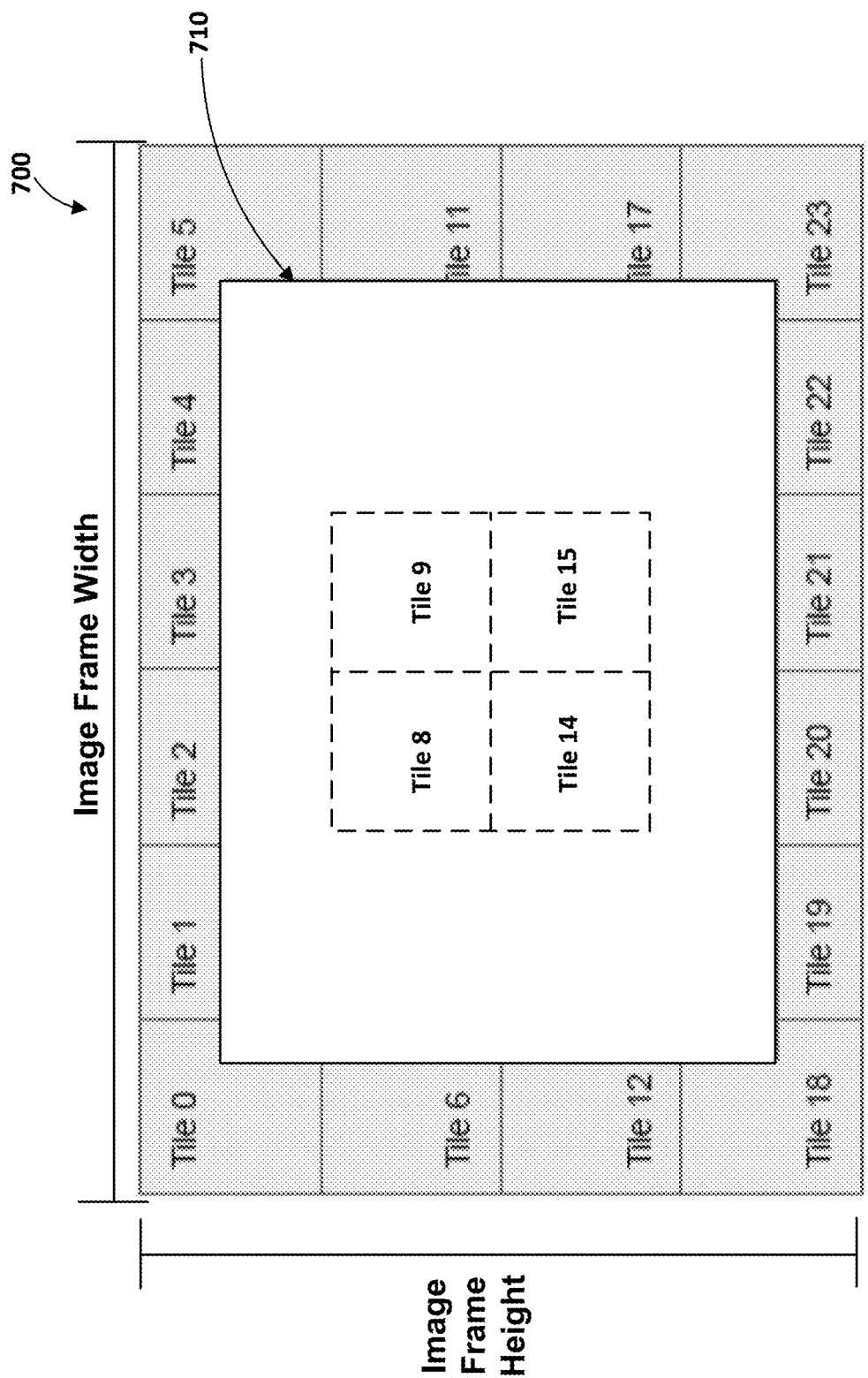
FIG. 7 is a conceptual illustration of an alternative image frame showing a bounding region, according to an example implementation.

FIG. 7 illustrates a conceptual representation of an alternative image frame 700 captured by an image capture device, such as the image capture device 402 of FIG. 4. The alternative image frame 700 may be part of a burst of a sequence of image frames captured by the image capture device. As shown in FIG. 7, the alternative image frame 700 may be divided into equal sized tiles. For example, the alternative image frame 700 may be divided into a plurality of non-overlapping tiles arranged in a plurality of horizontal rows and a plurality of vertical columns. Further, the tiles may have a rectangular or square shape. For ease of explanation, the plurality of the tiles may be arranged as a 4×6 array having four rows of tiles and six columns of tiles for a total of twenty-four tiles (e.g., $tile_0$-$tile_{23}$) as shown in FIG. 7. The alternative image frame 700 may be stored in an external memory and retrieved by a processor, such as the processor 406 of FIG. 4, for image processing. The processor may operate based on instructions, control information from registers, or both.

The processor may be configured to retrieve portions of the image data associated with the alternative image frame 700 from the external memory. The processor may combine the image data associated with the retrieved portions with image data associated with a base image frame (not shown) to form an output or combined image frame. The base image frame may be selected from the sequence of image frames and divided into tiles similar to the size and dimensions of the tiles of the alternative image frame 700. For example, the tiles of the base image frame may be non-overlapping and may have a rectangular or square shape.

The processor may be configured to select the image data associated with one or more tiles of the base image frame to combine with the image data associated with the alternative image frame 700. The processor may identify the tiles in the alternative image frame 700 that are co-located (e.g., temporally co-located) with the selected tiles of the base image frame. As shown in FIG. 7, the tiles (e.g., $tile_8$, $tile_9$, $tile_{14}$, and $tile_{15}$) of the alternative image frame 700 may be identified as co-located with the selected tiles of the base image frame. The co-located tiles (e.g., $tile_8$, $tile_9$, $tile_{14}$, and $tile_{15}$) may have the same coordinates, size, and shape as the selected tiles of the base image frame. As shown in FIG. 7, the co-located tiles (e.g., $tile_8$, $tile_9$, $tile_{14}$, and $tile_{15}$) may be continuous and/or neighboring tiles that are co-located with corresponding continuous and/or neighboring tiles of the selected tiles of the base image frame.

Once the processor identifies the co-located tiles of the alternative image frame 700, the processor may be configured to define a bounding region 710 in the alternative image frame that includes image data corresponding to the image data of the selected tiles of the base frame (e.g., matching image data). For example, the processor may determine a pixel width in the horizontal direction and a pixel height in the vertical component for the bounding region 710. The bounding region 710 may represent the image data associated with the alternative image frame 700 that the processor may fetch from external memory for combining with the image data of the selected tiles of the base image frame.

As shown in FIG. 7, the bounding region 710 in the alternative image frame 700 may have a pixel width in the horizontal direction and a pixel height in the vertical direction. For example, the bounding region 710 may have a particular pixel width (e.g., ±64 pixels) and a particular pixel height (e.g., ±32 pixels). In one example, the pixel width may include the horizontal width of the co-located tiles (e.g., $tile_8$, $tile_9$, $tile_{14}$, $tile_{15}$) of the alternative image frame 700 and a number of pixels to the right and left of the co-located tiles (e.g., $tile_8$, $tile_9$, $tile_{14}$, $tile_{15}$). Further, the pixel height may include the pixel height of the co-located tiles (e.g., $tile_8$, $tile_9$, $tile_{14}$, $tile_{15}$) and a number of pixels above and below the co-located tiles (e.g., $tile_8$, $tile_9$, $tile_{14}$, $tile_{15}$).

The processor may determine the dimensions associated with the bounding region 710 within the alternative image frame 700 in the horizontal direction, the vertical direction, or both directions. The processor may determine the bounding region 710 in the alternative image 700 frame by constraining on the displacement vectors of neighboring tiles so that the matching patches of neighboring tiles are within a predetermined bounding region. For example, the processor may limit the displacement vectors of the neighboring tiles below a threshold value. In some implementations, the processor may determine the bounding region 710 in the alternative image 700 frame based on predicted changes in the image data that occur between the base image frame and the alternative image frame 700. For example, the image data of the base image frame may change in the alternative image frame 700 due to movement of objects in the scene (e.g., a moving pedestrian) and/or movement of the image capture device (e.g., panning, tilt, zoom, rotation etc.) capturing the scene.

In some examples, the processor may determine the dimensions of the bounding region 710 in the alternative image frame 700 without searching for or identifying similar image data (e.g., matching patches) in the alternative image frame 700. For example, the processor may determine a pixel width in the horizontal direction and/or a pixel height in the vertical component for the bounding region 700. The pixel width and/or the pixel height may be constrained or restricted by predetermined ranges. The predetermined ranges may represent a horizontal displacement limit and/or a vertical displacement limit within the alternative image frame 710. The predetermined ranges may be based on user input or a statistical analysis of a number of image frames of one or more burst sequences. Further, the predetermined ranges may be generated dynamically. For example, the processor may determine the dimensions of a bounding region 700 based on maximum pixel heights and widths of bounding regions computed for previous bursts of image frames.

Once the processor determines the bounding region 710, the processor may generate a vector that identifies the bounding region 710 in the alternative image frame 700. The vector may have a plurality of dimensions, including x and y coordinates (x, y) to identify a location or a pixel of the bounding region, a pixel range in height (e.g., in a vertical direction), and a pixel range in width (e.g., in a horizontal direction). For example, the vector may include a horizontal component value (e.g., a row offset) and/or a vertical component value (e.g., a column offset), a pixel height, and a pixel width. In one example, the vector may include row and column offsets (e.g., (20, 25)) having a pixel range (−32, 32) in the vertical direction and a pixel range (−64, 64) in the horizontal direction. In some examples, the processor may generate one or more vectors to define the bounding region.

Once the vector is generated for the bounding region 710, the processor may use the vector to fetch the image data associated with the bounding region 710 in the alternative image frame 700 from the external memory. The image data associated with the bounding region 710 may include image data that corresponds to (e.g., matches) the image data associated with the selected tiles of the base image frame. The processor may generate addresses based on the vector to access the external memory for transferring the image data associated with the bounding region 710. The addresses may indicate a number of rows and columns associated with the bounding region 710. As such, the processor may fetch the image data associated with the bounding region 710 from the external memory that includes the matching image data associated with the selected tiles of the base image frame. As a result, the complexity of retrieving matching image data in the alternative image frame may be reduced and the efficiency of the fetching image data is enhanced.

After the processor fetches the image data associated with the bounding region 710, the processor may store the image data in internal memory and may search the image data to identify the corresponding image data (e.g., matching patch) associated with each of the selected tiles of the base image frame as described above. In other embodiments, the processor may use alignment information (e.g., displacement vectors) associated with the selected tiles of the base image frame to identify the matching image data in the fetched image data. The processor may combine the image data associated with each of the selected tiles of the base image frame with the corresponding image data (e.g., matching image data) associated with the matching patch to form an output image frame. The output image frame may have improved characteristics over the individual image frames of the sequence of image frames. For example, the output image frame may have a greater resolution, a higher dynamic range, a larger depth of field, less noise, a higher sharpness level, and/or less blurring than any of the image frames in the sequence.

Figure 8:
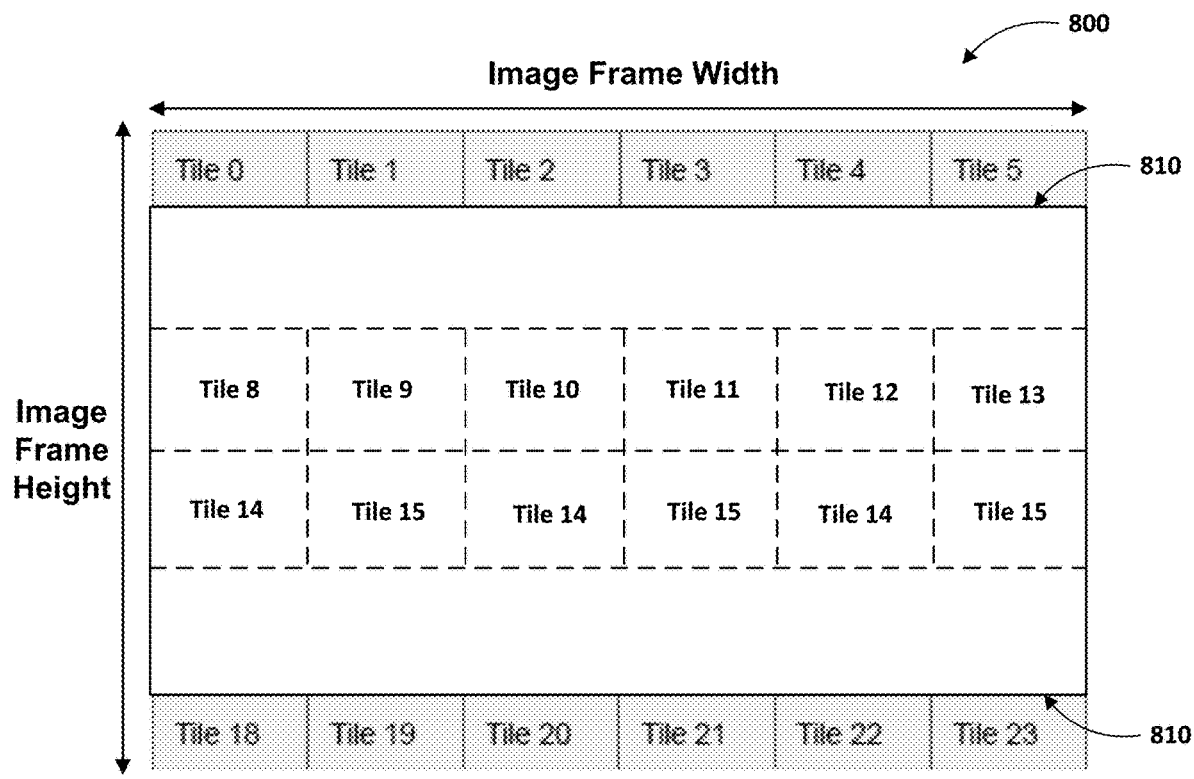
FIG. 8 is a conceptual illustration of an alternative image frame showing a bounding region, according to an example implementation.

FIG. 8 illustrates a conceptual representation of an alternative image frame 800. The alternative image frame 800 may be part of a burst of a sequence of image frames captured by an image capture device, such as the image capture device 402 of FIG. 4. The alternative image frame 800 may be constructed in a similar manner as the alternative image frame 700 of FIG. 7. The alternative image frame 800 may be stored in an external memory and a processor, such as the processor 406 of FIG. 4, may be configured to retrieve portions of the image data associated with the alternative image frame 800 from the external memory. The processor may operate based on instructions, control information from registers, or both. The processor may combine the image data of the retrieved portions with image data of a base image frame (not shown) to form an output or combined image frame. The base image frame may be selected from the sequence of image frames and divided into tiles similar to the size and dimensions of the tiles of the alternative image frame 800. For example, the tiles of the base image frame may be non-overlapping and may have a rectangular or square shape.

The processor may be configured to select the image data associated with one or more tiles of the base image frame to combine with the image data associated with the alternative image frame 800. The processor may identify the tiles in the alternative image frame 800 that are co-located (e.g., temporally co-located) with the selected tiles of the base image frame. In some examples, the processor may select the image data associated with one or more rows of the base image frame to combine with the image data associated with the alternative image frame 800. As shown in FIG. 8, the processor may identify tiles of one or more rows (e.g., $tile_8$-$tile_{13}$ and $tile_{14}$-$tile_{19}$) of the alternative image frame 800 that are co-located (e.g., temporally co-located) with the selected tiles of the base image frame. Each co-located tile (e.g., $tile_8$-$tile_{13}$ and $tile_{14}$-$tile_{19}$) may have the same coordinates, size, and shape as a tile of the selected tiles of the base image frame. As shown in FIG. 8, each row of the co-located tiles (e.g., $tile_8$-$tile_{13}$ and $tile_{14}$-$tile_{19}$) extends the full pixel width of the alternative image frame 800.

Once the processor identifies the co-located tiles (e.g., $tile_8$-$tile_{13}$ and $tile_{14}$-$tile_{19}$) of the alternative image frame 800, the processor may be configured to define a bounding region 810 in the alternative image frame 800 that includes image data corresponding to the image data associated with the selected tiles of the base image frame (e.g., matching or similar image data). The bounding region 810 represents the image data associated with the alternative image frame 800 that the processor may fetch from the external memory for combining with the image data associated with the selected tiles of the base image frame.

The processor may determine the dimensions associated with the bounding region 810 within the alternative image frame 810 in the vertical direction. The processor may determine the bounding region 810 in the alternative image frame 800 based on predicted changes in the image data that may occur between the base image frame and the alternative image frame 800. For example, the image data of the base image frame may change in the alternative image frame 800 due to movement of objects in the scene (e.g., a moving pedestrian) and/or movement of the image capture device (e.g., panning, tilt, zoom, rotation etc.) capturing the scene.

In some examples, the processor may determine the dimensions of the bounding region 810 in the alternative image frame 800 without searching for or identifying similar image data (e.g., matching patches) in the alternative image frame. For example, the processor may determine a pixel width in the horizontal direction and/or a pixel height in the vertical component for the bounding region. The pixel width and/or the pixel height may be constrained or restricted by predetermined ranges. The predetermined ranges may represent a vertical displacement limit within the alternative image frame. The predetermined ranges may be based on user input or a statistical analysis of a number of image frames of the burst. Further, the predetermined ranges may be generated dynamically. For example, the processor may determine the dimensions of a bounding region based on maximum pixel heights and widths of bounding regions computed for previous bursts of image frames.

As shown in FIG. 8, the bounding region 810 in the alternative image frame 800 may have a pixel height extending in the vertical direction and a pixel width that extends the entire width of the alternative image frame. For example, the bounding region may have a particular pixel height (e.g., ±32 pixels) and a pixel width equal to the width of the alternative image frame 800. As shown in FIG. 8, the pixel height of the bounding region 810 may include the pixel height of the two rows of tiles (e.g., $tile_8$-$tile_{13}$ and $tile_{14}$-$tile_{19}$) and a number of pixels above and below the rows of tiles. Thus, the bounding region 810 may include the entire width of the alternative image frame 800 and a pixel range in height (e.g., in a vertical direction).

Figure 9:
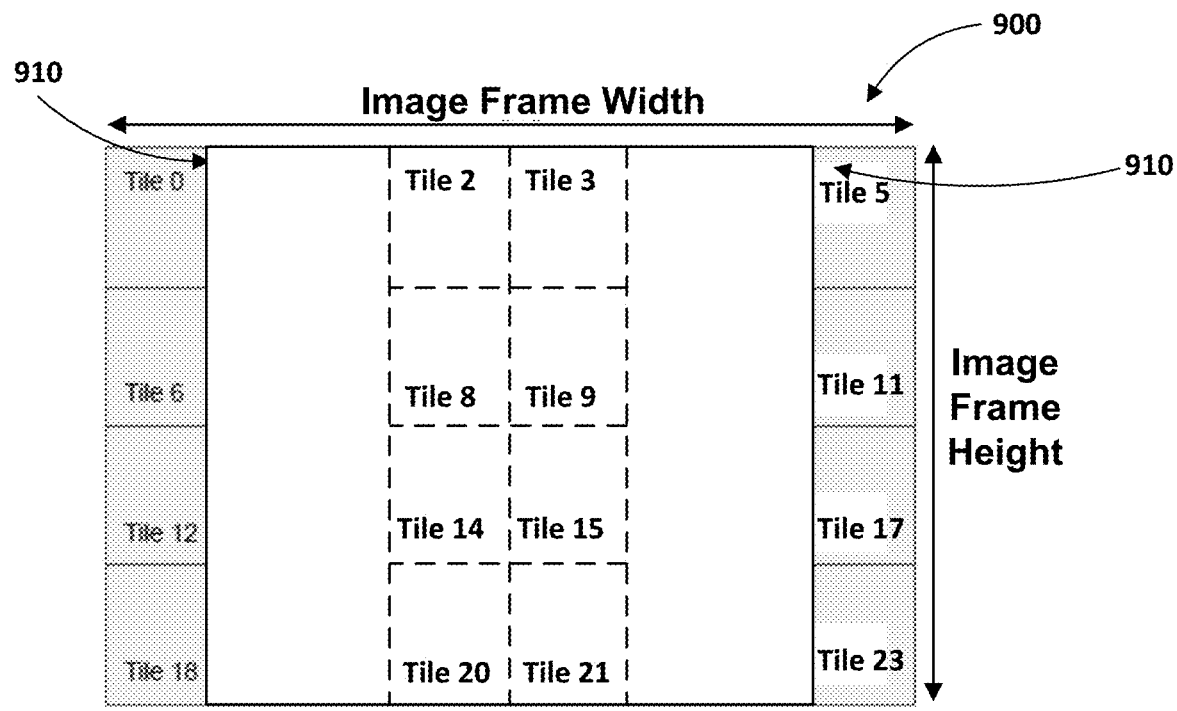
FIG. 9 is a conceptual illustration of an alternative image frame showing a bounding region, according to an example implementation.

In some examples, the bounding region may have a pixel height that extends the full height of an alternative image frame. FIG. 9 illustrates a conceptual representation of an alternative image frame 900 illustrating a bounding region 910 having a pixel width and a pixel height that extends the full height of the alternative image frame 900. The alternative image frame 900 may be constructed in a similar manner as the alternative image frame 700 of FIG. 7. For example, the bounding region 910 may have a pixel width (e.g., ±32 pixels) and may have a pixel height equal to the height of the alternative image frame 910. As shown in FIG. 9, the pixel width of the bounding region 910 may include the pixel width of the two columns of tiles and a number of pixels to the right and left of the two columns. Thus, the bounding region 910 in the alternative image frame 910 may include a pixel width and a pixel height that extends the entire height of the alternative image frame (e.g., in the vertical direction).

Once the processor determines the bounding region in the alternative image frame, the processor may generate a vector that identifies the bounding region in the alternative image. The vector may have a plurality of dimensions, including x and y coordinates (x, y) to identify a location of the bounding region and a pixel range in width (e.g., in a horizontal direction). For example, the vector may include a horizontal component value (e.g., a row offset) and a pixel width. In one example, the vector may include row and column offsets (e.g., (20, 25)) having a range in the horizontal direction. As described above, in some examples, the range in the vertical direction may be equal to the entire height of the image frame and/or the range in the horizontal may be equal to the entire width of the image frame. In some examples, the processor may generate one or more vectors to define the bounding region.

Once the vector is generated for the bounding region, the processor may use the vector to fetch the image data associated with the bounding region in the alternative image from the external memory. The image data associated with the bounding region may include image data that corresponds (e.g., matches) to the image data associated with the selected tiles of the base image frame. The processor may generate addresses based on the vector to access the external memory for transferring the image data associated with the bounding region. The addresses may indicate a number of rows and columns associated with the bounding region. As such, the processor may fetch the image data associated with the bounding region from the external memory that includes the matching image data associated with the selected tile of the base image frame. As a result, the complexity of retrieving matching image data in the alternative image frame may be reduced and the efficiency of the fetching image data may be enhanced.

After the processor retrieves the image data associated with the bounding region in the alternative image frame, the processor may store the image data in internal memory and may search the image data associated with the bounding region to locate matching image data (e.g., matching patches) associated with each of the selected tiles of the base image frame as described above. In some examples, the processor may use alignment information (e.g., displacement vectors) associated with the selected tiles of the base image frame to find the matching image data in the retrieved image data. The processor may combine the image data associated with each of the selected tiles of the base image frame with the corresponding image data associated with the matching image data to form an output image frame. The output image frame may have improved characteristics over the individual image frames of the sequence of image frames. For example, the output image frame may have a greater resolution, a higher dynamic range, a larger depth of field, less noise, and/or a higher sharpness level than any of the individual images in the image sequence.

Figure 10:
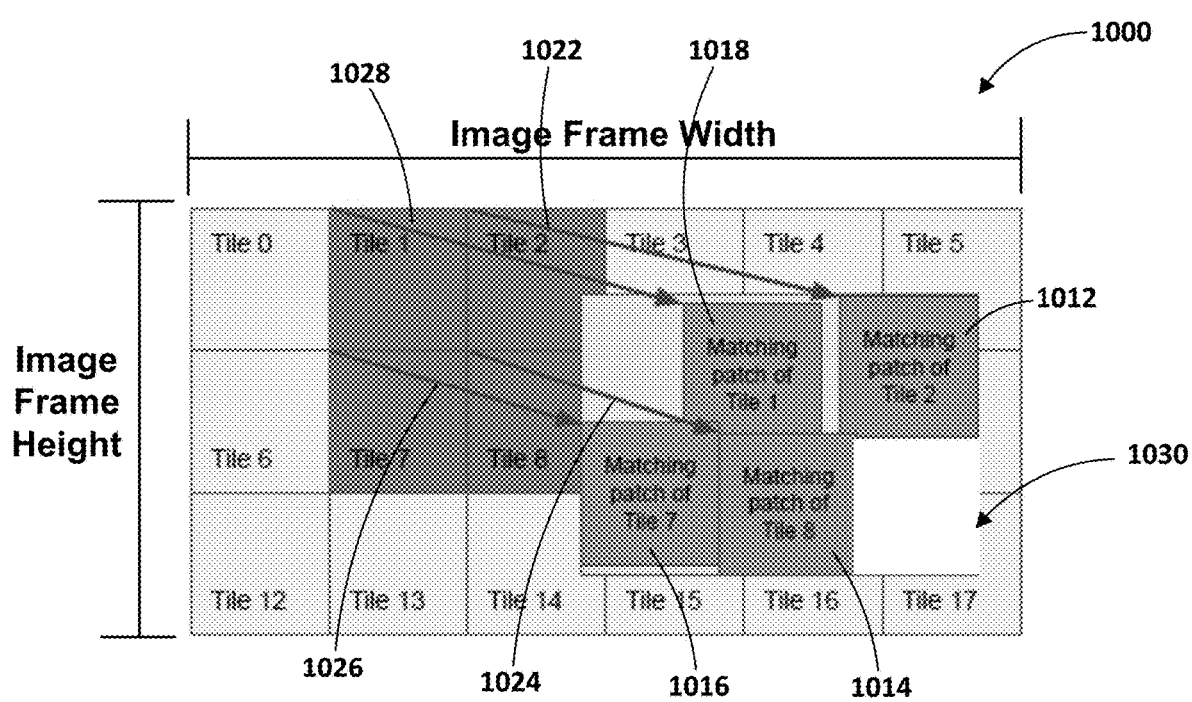
FIG. 10 is a conceptual illustration of an alternative image frame showing a bounding region, according to an example implementation.

FIG. 10 illustrates a conceptual representation of an alternative image frame 1000 captured by an image capture device, such as the image capture device 400 of FIG. 4. The alternative image frame 1000 may be part of a burst of a sequence of image frames captured by the image capture device. As shown in FIG. 10, the alternative image frame 1000 may be divided into equal sized tiles. For example, the alternative image frame 1000 may be divided into a plurality of non-overlapping tiles arranged in a plurality of horizontal rows and a plurality of vertical columns. Further, the tiles may have a rectangular or square shape. For ease of explanation, the plurality of the tiles may be arranged as a 3×6 array having three rows of tiles and six columns of tiles for a total of eighteen tiles ($tile_0$-$tile_{17}$) as shown in FIG. 10.

The alternative image frame 1000 may be stored in external memory, and a processor, such as the processor 406 of FIG. 4, may be configured to retrieve portions of the image data associated with the alternative image frame 1000 from the external memory. The processor may operate based on instructions, control information from registers, or both. The processor may combine image data associated with the portions of the alternative image frame 1000 with image data associated with a base image frame (not shown) to form an output or combined image frame. The base image frame may be selected from the sequence of image frames and divided into tiles similar to the size and dimensions of the tiles of the alternative image frame 1000. For example, the tiles may be non-overlapping and may have a rectangular or square shape.

The processor may be configured to select the image data associated with one or more tiles of the base image frame to combine with the image data associated with the alternative image frame 1000. The processor may obtain alignment information or an alignment map for each of the selected tiles of the base image frame. The alignment information may be stored with the image data associated with the selected tiles of the base image frame or in a list of alignment information. The alignment information may include a displacement vector for each of the selected tiles of the base image frame that may identify a co-located tile of the alternative image frame 1000 and a matching patch (e.g., matching image data) in the alternative image frame 1000. For example, each displacement vector may represent a displacement or offset between the matching patch and the co-located tile in the alternative image frame 1000. The co-located tiles of the alternative image frame may have the same coordinates, size, and shape as the selected tiles of the base image frame.

As shown in FIG. 10, the processor may identify matching patches 1012, 1014, 1016, 1018 in the alternative image frame 1000 using displacement vectors 1022, 1024, 1026, and 1028 that extend from tiles (e.g., $tile_1$, $tile_2$, $tile_7$, and tiles) in the alternative image frame 1000 to the matching patches 1012, 1014, 1016, 1018. The tiles (e.g., $tile_1$, $tile_2$, $tile_7$, and tiles) in the alternative image frame 1000 may be co-located with the selected tiles of the base image frame. In one example, the tiles (e.g., $tile_1$, $tile_2$, $tile_7$, and tiles) may be continuous and/or neighboring tiles that are co-located with corresponding continuous and/or neighboring tiles of the base image frame.

The processor may be configured to compare the displacement vectors 1022, 1024, 1026, and 1028 to each other and determine a difference between each of the displacement vectors 1022, 1024, 1026, and 1028. The processor may compare the differences between the displacement vectors 1022, 1024, 1026, and 1028 to a threshold value. In one example, the processor may compare the magnitudes of the displacement vectors 1022, 1024, 1026, and 1028 and/or the direction or orientation of the displacement vectors 1022, 1024, 1026, and 1028. When the comparison of the difference to the threshold value indicates that the displacement vectors 1022, 1024, 1026, and 1028 are substantially similar, the processor may select the displacement vectors 1022, 1024, 1026, and 1028 and use the selected displacement vectors 1022, 1024, 1026, and 1028 to identify the matching patches 1012, 1014, 1016, and 1018 in the alternative image frame 1000. For example, if the difference is smaller than and/or equal to a threshold value (e.g., indicating that the displacement vectors 1022, 1024, 1026, and 1028 are substantially similar), the processor may select the displacement vectors 1022, 1024, 1026, and 1028 for identifying matching patches 1012, 1014, 1016, and 1018 that correspond to the image data associated with the selected tiles of the base image frame.

After the processor selects the displacement vectors 1022, 1024, 1026, and 1028 that may be substantially similar, the processor may define a bounding region 1030 that encompasses the matching patches 1012, 1014, 1016, and 1018 identified by the displacement vectors 1022, 1024, 1024, and 1026. As shown in FIG. 10, the bounding region 1030 may have a pixel width in the horizontal direction and a pixel height in the vertical direction. For example, the bounding region 1030 may have a pixel width (e.g., ±64 pixels) and a pixel height (e.g., ±32 pixels).

The processor may determine the dimensions associated with the bounding region 1030 within the alternative image frame 1000 in the horizontal direction, the vertical direction, or both directions. The processor may determine the bounding region 1030 in the alternative image 1000 frame by constraining the difference of the displacement vectors of neighboring tiles so that the matching patches of the neighboring tiles are within a predetermined bounding region. For example, the processor may limit the difference of the displacement vectors of the neighboring tiles below a threshold value.

In some embodiments, the processor may be configured to detect the smallest possible bounding region that encompasses the image data associated with the identified matching patches 1012, 1014, 1016, and 1018 in the alternative image frame 1000. In such embodiments, the smallest possible bounding region refers to the borders or boundaries of the bounding region 1030 having an upper boundary at the same height as an upper edge of a top-most matching patch, a lower boundary at the same height as a lower edge of a bottom-most matching patch, a left side boundary at the same vertical location as a left edge of a left-most matching patch, and a right side boundary at the same vertical location as a right edge of a right-most matching patch. In some examples, the borders of a smallest possible bounding region may include the pixels within an optimal distance to the outer-most edges of the matching patches described above.

Once the processor determines the bounding region 1030 in the alternative image frame 1000, the processor may generate a vector that identifies the bounding region 1030 in the alternative image frame 1000. The vector may have a plurality of dimensions, including x and y coordinates (x, y) to identify a location or a pixel of the bounding region, a pixel range in height (e.g., in a vertical direction), and a pixel range in width (e.g., in a horizontal direction). For example, the vector may include a horizontal component value (e.g., a row offset) and/or a vertical component value (e.g., a column offset), a pixel height, and a pixel width. In one example, the vector may include row and column offsets (e.g., (20, 25)) having a range (−32, 32) in the vertical direction and a range (−64, 64) in the horizontal direction. In some examples, the processor may generate one or more vectors to define the bounding region.

The processor may limit the dimensions associated with the bounding region 1030 in the horizontal direction, the vertical direction, or both directions. For example, the processor may determine horizontal limits and/or vertical limits of the bounding region based on predetermined ranges. The predetermined ranges may represent a horizontal displacement limit and/or a vertical displacement limit within the alternative image frame 1000. The predetermined ranges may be based on user input or a statistical analysis of a number of image frames of the burst. Further, the predetermined ranges may be generated dynamically. For example, the processor may determine the dimensions of a bounding region based on a maximum pixel height and/or width of bounding regions computed for previous bursts of image frames.

Once the vector that identifies the bounding region 1030 is generated, the processor may use the vector to fetch the image data associated with the boundary region 1030 in the alternative image frame 1000 from external memory. The image data associated with the bounding region 1030 may include image data that corresponds to (e.g., matches) the image data associated with the selected tiles of the base image frame. The processor may generate addresses based on the vector to access the external memory for transferring the image data associated with the bounding region 1030. The addresses may indicate a number of rows and columns associated with the bounding region 1030. As such, the processor may fetch the image data associated with the bounding region 1030 from the external memory that includes the matching image data associated with the selected tile of the base image frame.

After the processor retrieves the image data associated with the bounding region 1030, the processor may store the image data in an internal memory and may search the image data to identify the corresponding image data (e.g., matching patch) for each of the selected tiles of the base image frame as described above. In other embodiments, the processor may use alignment information (e.g., displacement vectors) associated with each tile of the base image frame to locate matching image data (e.g., matching patches) in the alternative image frame 1000 as described above. The processor may combine the image data of each of the selected tiles of the base image frame with the corresponding image data associated with the matching patch to form an output image frame. The output image frame may have improved characteristics over the individual image frames of the sequence of image frames. For example, the output image frame may have a greater resolution, a higher dynamic range, a larger depth of field, less noise, and/or a higher sharpness level than any of the individual images in the image sequence.

Figure 11:
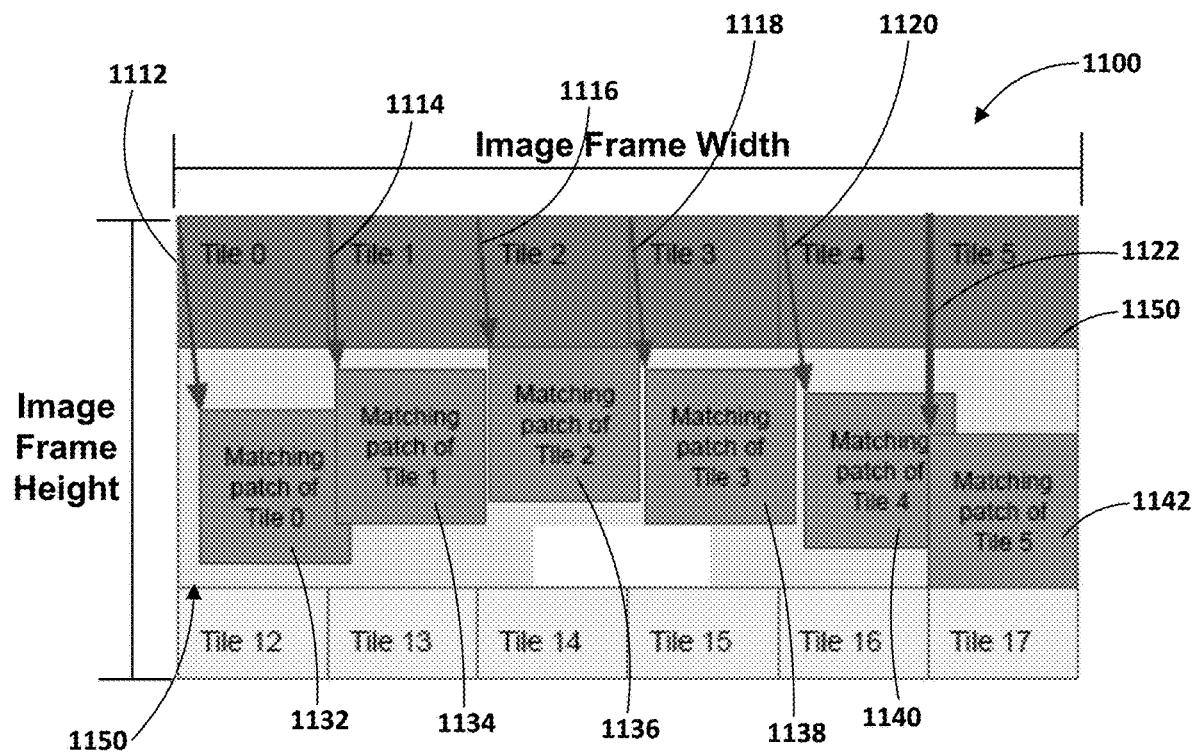
FIG. 11 is another conceptual illustration of an alternative image frame showing a bounding region, according to an example implementation.

FIG. 11 illustrates a conceptual representation of an alternative image frame 1100. The alternative image frame 1100 may be part of a burst sequence of image frames captured by an image capture device, such as the image capture device 400 of FIG. 4. The alternative image frame 1100 may be constructed in a similar manner as the alternative image frame 1000 of FIG. 10. The alternative image frame 1100 may be stored in an external memory and a processor, such as the processor 406 of FIG. 4, may be configured to retrieve portions of the image data associated with the alternative image frame 1100 from the external memory. The processor 406 may operate based on instructions, control information from registers, or both. The processor may combine the image data of the retrieved portions with image data of a base image frame (not shown) to form an output or combined image frame. The base image frame may be selected from the sequence of image frames and divided into tiles similar to the size and dimensions of the tiles of the alternative image frame 1100. For example, the tiles may be non-overlapping and may have a rectangular or square shape.

The processor may be configured to select one or more tiles of the base image frame to combine with image data of the alternative image frame 1100. The processor may obtain alignment information associated with each of the selected tiles of the base image frame. The alignment information may be stored with the image data associated with the selected tiles of the base image frame or in a list of alignment information.

In some examples, the processor may select the image data associated with one or more rows of the base image frame to combine with the image data associated with the alternative image frame 1100. The processor may obtain the alignment information for each tile of the one or more selected rows of the base image frame. The alignment information may include a displacement vector for each of the selected tiles of the base image frame that may identify a co-located tile and a matching patch (e.g., matching image data) in the alternative image frame 1100. For example, each displacement vector may represent a displacement or offset between the matching patch and the co-located tile in the alternative image frame 1100. The co-located tiles of the alternative image frame 1100 may have the same coordinates, size, and shape as the selected tiles of the base image frame.

As shown in FIG. 11, the processor may use displacement vectors 1112, 1114, 1116, 1118, 1120, and 1122 to identify the matching patches 1132, 1134, 1136, 1138, 1140, and 1142 in the alternative image frame 1100. The displacement vectors 1112, 1114, 1116, 1118, 1120, and 1122 may extend from the co-located tiles (e.g., $tile_1$-$tile_5$) to the matching patches 1132, 1134, 1136, 1138, 1140, and 1142. As shown in FIG. 11, the co-located tiles (e.g., $tile_1$-$tile_5$) may include one row of the alternative image frame 1100 that extends the full pixel width of the alternative image frame 1100. In other embodiments, the co-located tiles may include one or more rows of the alternative image frame 1100.

The processor may define a bounding region 1150 in the alternative image frame 1100 that encompasses the matching patches 1132, 1134, 1136, 1138, 1140, and 1142 identified by the displacement vectors 1112, 1114, 1116, 1118, 1120, and 1122 associated with selected tiles of the base image frame. The bounding region 1150 may represent the image data associated with the alternative image frame 1100 that the processor may fetch for combining with the image data of the selected tiles of the base image frame. As shown in FIG. 11, the bounding region 1150 in the alternative image frame may have a pixel height extending in the vertical direction and a pixel width that extends the entire width of the alternative image frame 1100. For example, the bounding region 1050 may have a pixel height (e.g., ±32 pixels) and a pixel width equal to the width of the alternative image frame.

As shown in FIG. 11, the bounding region 1150 refers to the borders of the bounding region 1050 having an upper boundary at the same height as an upper edge of a top-most matching patch (e.g., matching patch 1136) and a lower boundary at the same height as a lower edge of a bottom-most matching patch (e.g., matching patch 1142), a left side boundary at the same vertical location as a left edge of an alternative image frame, and a right side boundary at the same vertical location as a right edge of an alternative image frame. In some examples, the borders of a bounding region 1150 include the pixels within an optimal distance to the outer-most edges of the upper and lower matching patches.

The processor may limit the dimensions associated with the bounding region 1150 in the vertical direction. For example, the processor may determine vertical limits of the bounding region based on predetermined ranges. The predetermined ranges may represent a vertical displacement limit within the alternative image frame 1100. The predetermined range may be based on user input or a statistical analysis of a number of image frames of the burst. Further, the predetermined ranges may be generated dynamically. For example, the processor may determine the dimensions of a bounding region 1150 based on maximum pixel heights and widths of bounding regions computed for previous bursts of image frames.

Figure 12:
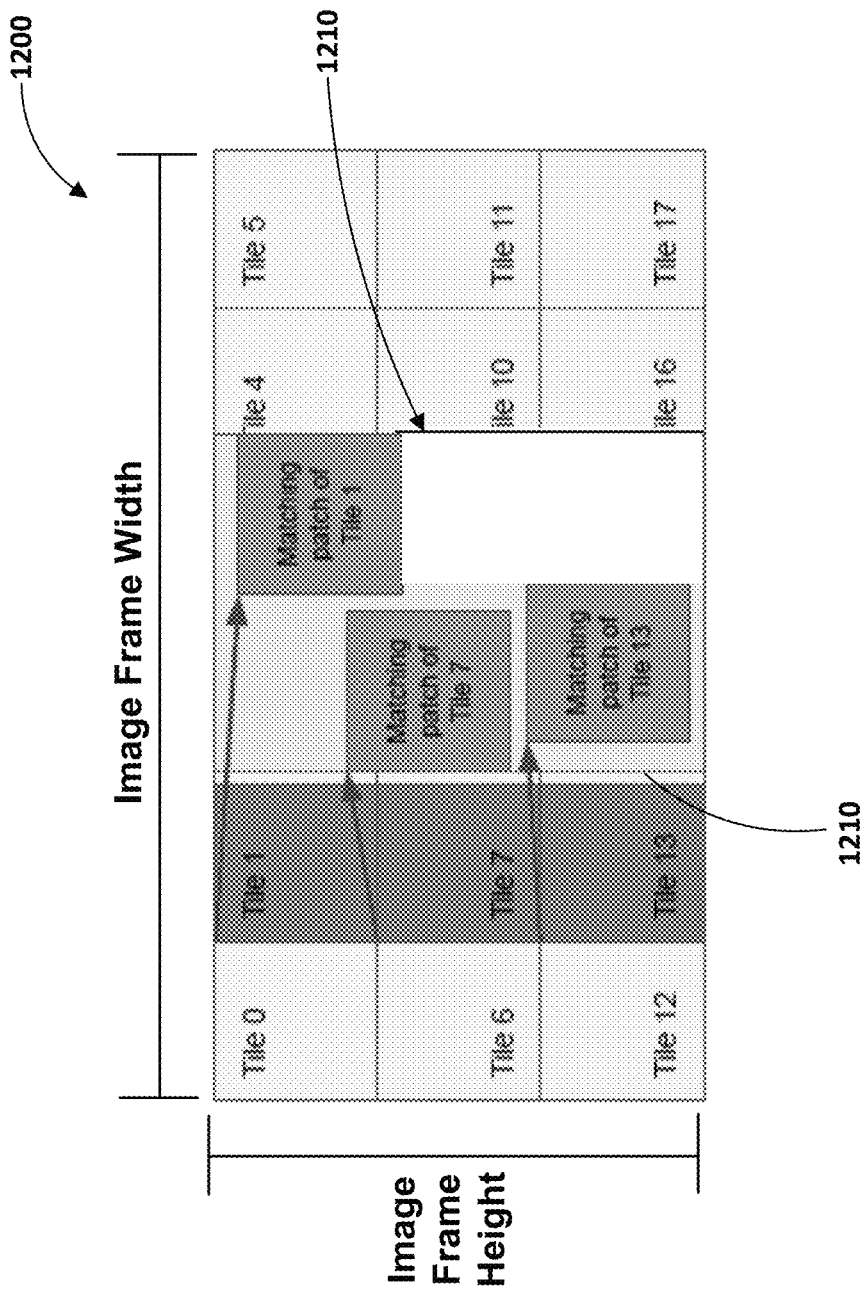
FIG. 12 is another conceptual illustration of an alternative image frame showing a bounding region, according to an example implementation.

In some examples, the bounding region may extend the full height of the alternative image frame. For example, the bounding region in the alternative image frame may have a pixel width extending in the horizontal direction and a pixel height that extends the entire height of the alternative image frame. FIG. 12 illustrates an alternative image frame 1200 having a bounding region 1210 that includes a pixel width and a pixel height that extends the full height of the alternative image frame. As shown in FIG. 12, the bounding region 1210 may have a pixel height equal to the height of the alternative image frame 1200 and may have a pixel width (e.g., ±32 pixels). The dimensions of the bounding region 1200 may be limited in the horizontal direction based on predetermined ranges.

Once the processor determines the bounding region, the processor may generate a vector that identifies the bounding area in the alternative image frame. The vector may have a plurality of dimensions, including x and y coordinates (x, y) to identify a location or a pixel of the bounding region, a pixel range in height (e.g., in a vertical direction), and a pixel range in width (e.g., in a horizontal direction). For example, the vector may include a horizontal component value (e.g., a row offset) and/or a vertical component value (e.g., a column offset), a pixel height, and a pixel width. In one example, the vector may include row and column offsets (e.g., (20, 25)) having a range (−32, 32) in the vertical direction and a range (−64, 64) in the horizontal direction. In some examples, the processor may generate one or more vectors to define the bounding region.

Once the vector that identifies the bounding region is generated, the processor may use the vector to fetch the image data associated with the boundary region of the alternative image frame from the external memory. The image data associated with the bounding regions may include image data that corresponds (e.g., matches) to the image data associated with selected tiles of the base image frame. The processor may generate addresses based on the vector to access the external memory for transferring the image data associated with the bounding region. The addresses may indicate a number of rows and columns associated with the bounding region. As such, the processor may fetch the image data associated with the bounding region from the external memory that includes the matching image data associated with the selected tile of the base image frame. As a result, the processor may fetch full lines of image data associated with the alternative image data, increasing the efficiency in the transfer of image data from memory.

After the processor retrieves the image data associated with the bounding region, the processor may store the image data in internal memory and may search the image data to identify the corresponding image data (e.g., matching patch) associated with each of the selected tiles of the base image frame as described above. In other embodiments, the processor may use alignment information or alignment maps associated with each tile of the base image frame to locate matching image data (e.g., matching patches) associated with the alternative image frame. The processor may combine the image data associated with each of the selected tiles of the base image frame with the corresponding image data associated with the matching patch to form an output image frame. The output image frame may have improved characteristics over the individual image frames of the sequence of image frames. For example, the output image frame may have a greater resolution, a higher dynamic range, a larger depth of field, less noise, and/or a higher sharpness level than any of the individual images in the image sequence.

Figure 13:
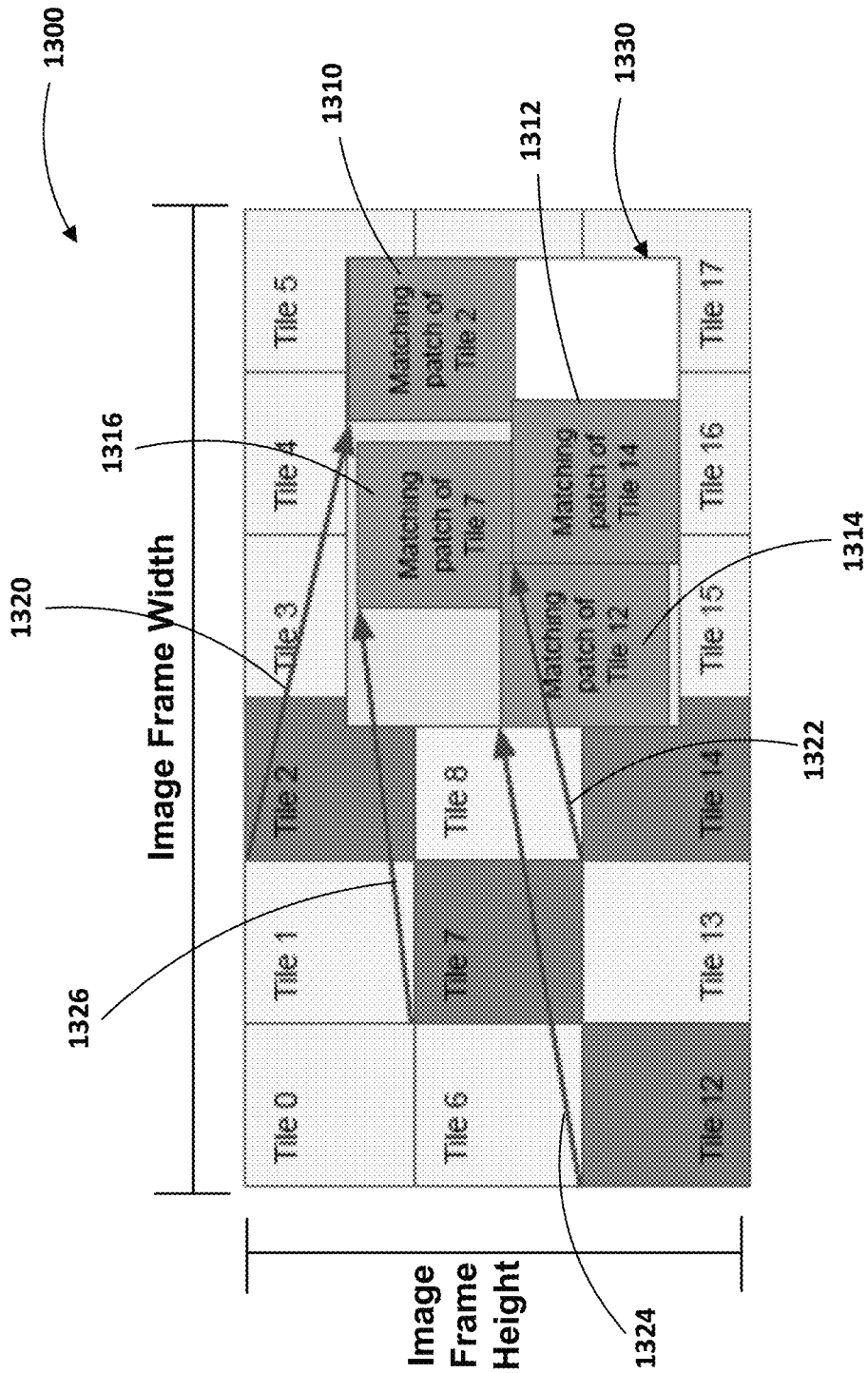
FIG. 13 is a conceptual illustration of an alternative image frame showing a bounding region, according to an example implementation.

FIG. 13 illustrates a conceptual representation of an alternative image frame 1300 captured by an image capture device, such as the image capture device 400 of FIG. 4. The alternative image frame 1300 may be part of a burst of a sequence of image frames captured by the image capture device. As shown in FIG. 13, the alternative image frame 1300 may be divided into equal sized tiles. For example, the alternative image frame 1300 may be divided into a plurality of non-overlapping tiles arranged in a plurality of horizontal rows and a plurality of vertical columns. Further, the tiles may have a rectangular or square shape. For ease of explanation, the plurality of the tiles may be arranged as a 3×6 array having three rows of tiles and five columns of tiles for a total of eighteen tiles ($tile_0$-$tile_{17}$) as shown in FIG. 13.

The alternative image frame 1300 may be stored in an external memory, and a processor, such as the processor 406 of FIG. 4, may be configured to retrieve portions of the image data associated with the alternative image frame 1300 from the external memory. The processor 406 may operate based on instructions, control information from registers, or both. The processor may combine the portions of the image data associated with the alternative image frame 1300 with image data associated with a base image frame (not shown) to form an output or combined image frame. The base image frame may be selected from the sequence of image frames and divided into tiles similar to the size and dimensions of the tiles of the alternative image frame 1300. For example, the tiles may be non-overlapping and may have a rectangular or square shape.

The processor may be configured to select one or more tiles of the base image frame and may obtain alignment information or alignment maps associated with the tiles of the base image frame. The alignment information associated with each selected tile of the base image data may be stored with the image data associated with the tile or in a list of alignment information. The alignment information may include a displacement vector for each selected tile of the base image frame that may identify a co-located tile and a matching patch in the alternative image frame 1300 for the tile of the base image frame. Each displacement vector may represent a displacement or offset between the matching patch and the co-located tile in the alternative image frame 1300. The co-located tiles of the alternative image frame 1300 may have the same coordinates, size, and shape as the selected tile of the base image frame.

As shown in FIG. 13, the processor may identify matching patches 1310, 1312, 1314, and 1316 using the displacement vectors 1320, 1322, 1324, and 1326 that extend from the tiles (e.g., $tile_2$, $tile_7$, $tile_{12}$, and $tile_{14}$) in the alternative image frame 1300 to the matching patches 1310, 1312, 1314, and 1316. The tiles (e.g., $tile_2$, $tile_7$, $tile_{12}$, and $tile_{14}$) in the alternative image frame 1300 may be co-located with the selected tiles in the base image frame.

The processor may be configured to compare the locations of the matching patches 1310, 1312, 1314, and 1316 to each other and determine a difference between each of the locations. For example, the processor may compare the difference between the locations of the matching patches 1310, 1312, 1314, and 1316 to a threshold value. When the comparison of the difference to the threshold value indicates that the matching patches 1310, 1312, 1314, and 1316 are in close proximity, the processor may select the matching patches 1310, 1312, 1314, and 1316 to include in a bounding region as further described below. For example, if the difference is smaller than and/or equal to a threshold value (e.g., indicating that the displacement vectors are substantially similar), the processor may select the matching patch 1310, 1312, 1314, and 1316 to encompass in a bounding region. As shown in FIG. 13, the processor may determine that the matching patches 1310, 1312, 1314, and 1316 are in close proximity to each other and select the matching patches 1310, 1312, 1314, and 1316 to include in a bounding region 1330.

After the processor identifies the matching patches 1310, 1312, 1314, and 1316 that are in close proximity, the processor may define the bounding region 1330 in the alternative image frame 1300 that encompasses the matching patches 1310, 1312, 1314, and 1316. The bounding region 1330 represents the image data associated with the alternative image frame 1300 that the processor may fetch for combining with the image data associated with the selected tiles of the base image frame. As shown in FIG. 13, the bounding region 1330 may have a pixel width in the horizontal direction and a pixel height in the vertical direction. For example, the bounding region may have a width (e.g., ±64 pixels) and a height (e.g., ±32 pixels).

The processor may limit the dimensions associated with the bounding region 1330 in the horizontal direction, the vertical direction, or both directions. For example, the processor may determine horizontal limits and/or vertical limits of the bounding region 1330 based on predetermined ranges. The predetermined ranges may represent a horizontal displacement limit and/or a vertical displacement limit within the alternative image frame 1300. The predetermined ranges may be based on user input or a statistical analysis of a number of image frames of the burst. Further, the predetermined ranges may be generated dynamically. For example, the processor may determine the dimensions of a bounding region 1330 based on maximum pixel heights and widths of bounding regions computed for previous bursts of image frames.

In some embodiments, the processor may be configured to detect the smallest possible bounding region 1330 that encompasses the image data of the matching patches 1310, 1312, 1314, and 1316 in the alternative image frame. The smallest possible bounding region may refer to the borders or boundary of the bounding region having an upper boundary at the same height as an upper edge of a top-most matching patch, a lower boundary at the same height as a lower edge of a bottom-most matching patch, a left side boundary at the same vertical location as the left edge of a left-most matching patch, and a right side boundary at the same vertical location as a right edge of a right-most matching patch. In some examples, the borders of a smallest possible bounding region include the pixels within an optimal distance to the outer-most edges of the matching patches.

Figure 14:
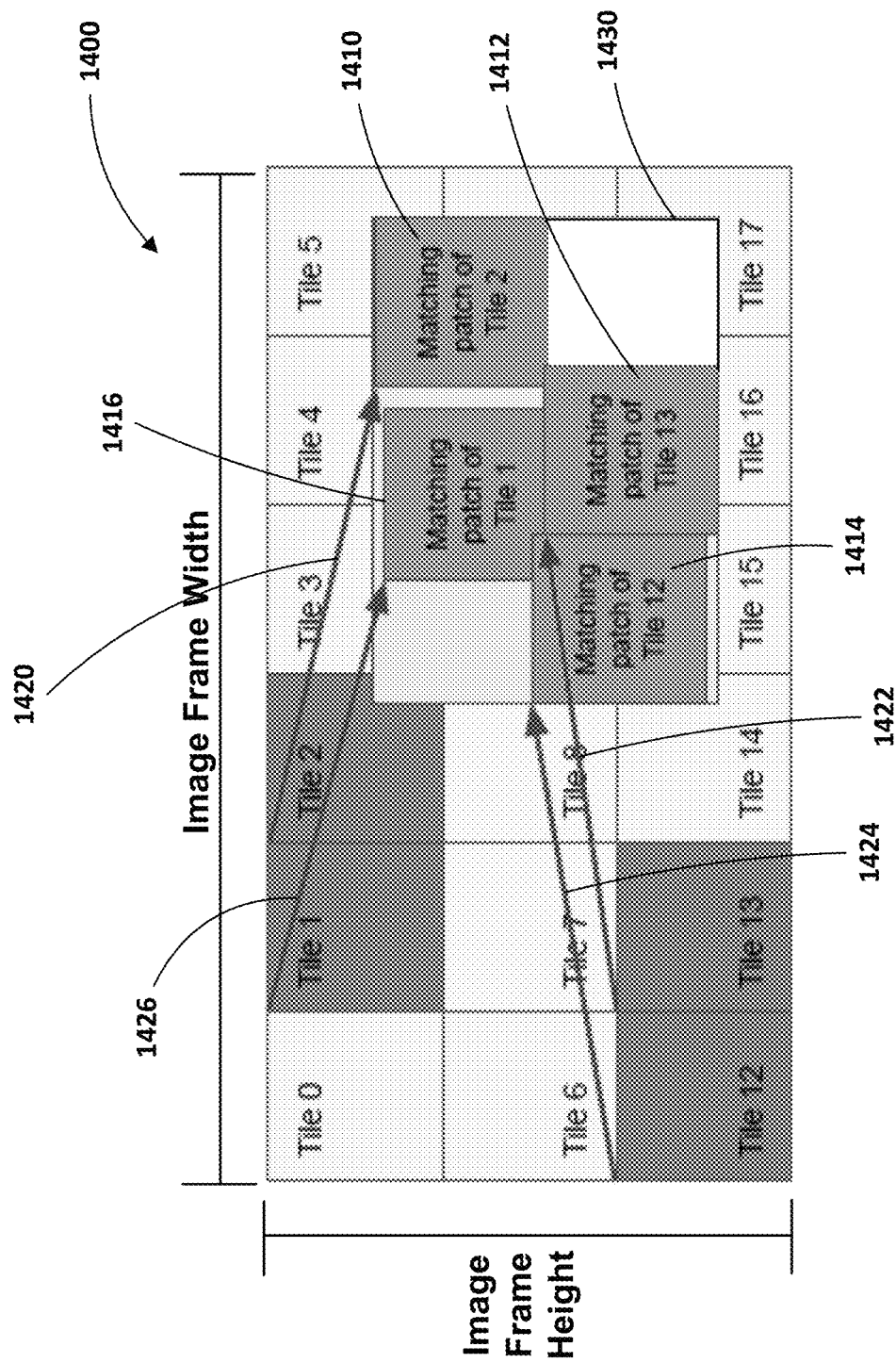
FIG. 14 is another conceptual illustration of an alternative image frame showing a bounding region, according to an example implementation.

In other examples, the processor may determine a bounding region for continuous and/or neighboring tiles of an alternative image frame. FIG. 14 shows an alternative image frame 1400 having displacement vectors 1420, 1422, 1424, and 1426 extending from co-located tiles (e.g., $tile_1$, $tile_2$, $tile_{12}$, and $tile_{13}$) to matches patches 1410, 1412, 1414, and 1416 in a boundary region 1430. In some example, two or more of the co-located tiles (e.g., $tile_1$, $tile_2$, $tile_{12}$, and $tile_{13}$) may be continuous and/or neighboring tiles that are co-located with corresponding continuous and/or neighboring tiles of the selected tiles of the base image frame. The processor may determine that the matching patches 1410,

1412, 1414, and 1416 are in close proximity to each other and select the matching patches to include in a bounding region 1430.

Once the processor determines the bounding region in the alternative image frame, the processor may generate a vector that identifies the bounding area in the alternative image frame. The vector may have a plurality of dimensions, including x and y coordinates (x, y) to identify a location or a pixel of the bounding region, a pixel range in height (e.g., in a vertical direction), and a pixel range in width (e.g., in a horizontal direction). For example, the vector may include a horizontal component value (e.g., a row offset) and/or a vertical component value (e.g., a column offset), a pixel height, and a pixel width. In one example, the vector may include row and column offsets (e.g., (20, 25)) having a range (−32, 32) in the vertical direction and a range (−64, 64) in the horizontal direction. In some examples, the processor may generate one or more vectors to define the bounding region.

Once the vector that identifies the bounding region is generated, the processor may use the vector to fetch the image data associated with the boundary region of the alternative image from the external memory. The image data associated with the bounding regions may include image data that corresponds (e.g., matches) to the image data associated with the selected tiles of the base image frame. The processor may generate addresses based on the vector to access the external memory for transferring the image data associated with the bounding region. The addresses may indicate a number of rows and columns associated with the bounding region. As such, the processor may fetch the image data associated with the bounding region from the external memory that includes the matching image data associated with the selected tile of the base image frame.

After the processor retrieves the image data associated with the bounding region in the alternative image frame, the processor may store the image data in internal memory and may search the image data to identify the corresponding image data (e.g., matching patch) for each of the selected tiles of the base image frame. In other embodiments, the processor may use the displacement vectors associated with the tiles of the base frame to identify the matching image data for each of the selected tiles of the base image frame as described above. The processor may combine the image data associated with each of the selected tiles of the base image frame with the corresponding image data associated with the matching patch to form an output image frame. The output image frame may have improved characteristics over the individual image frames of the sequence of image frames. For example, the output image frame may have a greater resolution, a higher dynamic range, a larger depth of field, less noise, and/or a higher sharpness level than any of the individual images in the image sequence.

Figure 15:
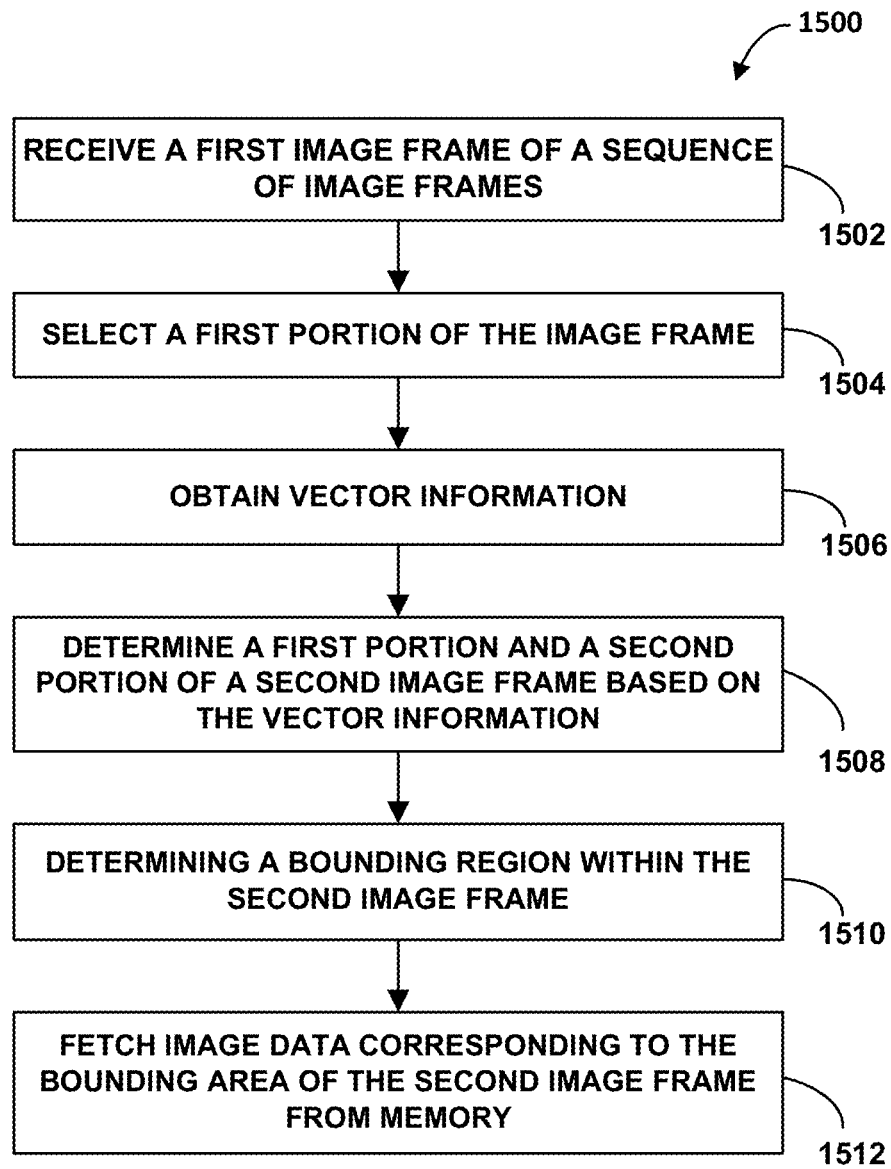
FIG. 15 is a flow chart of a method, according to an example implementation.

FIG. 15 is a flow chart of a method 1500 for fetching image data of image frames (e.g., images), according to an example implementation. The method 1500 represents an example method that may include one or more operations as depicted by one or more blocks 1502-1512, each of which may be carried out by any of the systems shown in FIGS. 1-4, among other possible systems. In an example implementation, a computing system or a sensor system (e.g., an image captured device, a sensor system 104, a control system 106, remote computing system 302, server computing system 306, or camera system 400) performs the illustrated operations, although in other implementations, one or more other systems can perform some or all of the operations.

Those skilled in the art will understand that the flow charts described herein illustrates functionality and operations of certain implementations of the present disclosure. In this regard, each block of the flowcharts may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example implementations of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

In line with the discussion above, a computing system or a sensor system (e.g., an image capture device, remote computing system 302, server computing system 306, or a camera system 400) may operate as shown by method 1500. At block 1502, the method 1500 involves receiving a first image frame of a sequence of image frames from an image capture device. The image capture device may capture the sequence of image frames during a burst sequence or payload burst. The sequence of image frames may be similar to the image frames described in reference to FIG. 5. The sequence of image frames may also include a second image frame. The second image frame may be captured prior or later in time than the first image frame. For example, the first image frame may be the image frame that is captured immediately before the second image frame, in which case the first image frame and the second image frame are consecutive image frames in the series of image frames. In other examples, the first image frame and the second image frame may not be consecutive frames, but instead may be further spaced apart in time and have one or more frames between them.

The first and second image frames of the sequence of image frames may be organized in a data stream and transmitted from the image capture device to a processor, such as the processor 406 of FIG. 4, and/or a memory, such as the system memory 404 of FIG. 4, for image processing. The processor may operate based on instructions, control information from registers, or both. The processor may divide the first image frame into a number of square or rectangular tiles. Each of the tiles represents a portion of the first image frame and may contain a number of pixels (e.g., image data). The processor may also divide the second image frame of the sequence of image frames into a number of square or rectangular tiles. Each of the first and second image frames may be divided into an array of non-overlapping tiles having substantially the same shape and size. Each of the tiles of the second image frame may be co-located with a corresponding tile in the first image frame. In other embodiments, the first and second image frames may include any number of tiles and each tile may include any number of pixels. Further, the tiles of the first and second image frame may have other shapes. Therefore, the present example is not limited in the number, size, and/or shape of the tiles that may be included in the first and second image frames of the series of image frames.

At block 1504, the method involves selecting a first portion of the first image frame. The processor may select a tile of the first image frame and may perform a search of the image data associated with the second image frame to identify tile-size areas, which may or may not be temporally co-located or aligned with the tile of the first image frame. The processor may perform a full search of all of the image data associated with the second image frame to identify one or more tile-size areas having similar or matching image data as the image data associated with the selected tile of the first image frame. In some embodiments, the processor may search a particular area in the second image frame to find similar or matching tile-size areas in the second image frame. The size of the search area may depend on image resolution (format), frame rate, and the type of application. In some embodiments, the search area can have a rectangular shape that includes a portion of the image data associated with the second image frame.

At block 1506, the method involves obtaining alignment information or alignment maps. The processor may obtain alignment information including displacement vectors for each of the selected tiles of the first image frame. The displacement vectors may be stored with the image data of the selected tiles of the first image frame or in a list of displacement vectors. Further, the processor may also obtain one or more vectors for bounding regions in the second image frame as further described below.

At block 1508, the method involves determining a first portion and a second portion of a second image frame based on the alignment information. The alignment information may include a displacement vector for each of the selected tiles of the first image frame. Each displacement vector may identify a co-located tile of the second image frame and a matching patch (e.g., matching image data) in the second image frame. For example, each displacement vector may represent a displacement or offset between the matching patch and the co-located tile in the second image frame. The co-located tiles of the second image frame may have the same coordinates, size, and shape as the selected tiles of the first image frame.

The processor may be configured to compare the displacement vectors to each other and determine a difference between each of the displacement vectors. The processor may compare the differences between the displacement vectors to a threshold value. In one example, the processor may compare the magnitudes of the displacement vectors and/or the direction or orientation of the displacement vectors. When the comparison of the difference to the threshold value indicates that the displacement vectors are substantially similar, the processor may select the displacement vectors and use the selected displacement vectors to identify the matching patches in the second image frame. For example, if the difference is smaller than and/or equal to a threshold value (e.g., indicating that the displacement vectors are substantially similar), the processor may select the displacement vectors for identifying matching patches that correspond to the image data associated with the selected tiles of the first image frame.

At block 1510, the method involves determining a bounding region within the second image frame. The bounding region may include at least the second portion of the second image frame. The processor may define a bounding region that encompasses the matching patches identified by the displacement vectors. The bounding region may have a pixel width in the horizontal direction and a pixel height in the vertical direction. For example, the bounding region may have a pixel width (e.g., ±64 pixels) and a pixel height (e.g., ±32 pixels).

In some embodiments, the processor may be configured to detect the smallest possible bounding region that encompasses the image data associated with the identified matching patches in the second image frame. In such embodiments, the smallest possible bounding region refers to the borders or boundaries of the bounding region having an upper boundary at the same height as an upper edge of a top-most matching patch, a lower boundary at the same height as a lower edge of a bottom-most matching patch, a left side boundary at the same vertical location as a left edge of a left-most matching patch, and a right side boundary at the same vertical location as a right edge of a right-most matching patch. In some examples, the borders of a smallest possible bounding box may include the pixels within an optimal distance to the outer-most edges of the matching patches described above.

Once the processor determines the bounding region, the processor may generate a vector that identifies the bounding region in the second image frame. The vector may have a plurality of dimensions, including x and y coordinates (x, y) to identify a location of the bounding region, a pixel range in height (e.g., in a vertical direction), and a pixel range in width (e.g., in a horizontal direction). For example, the vector may include a horizontal component value (e.g., a row offset), a vertical component value (e.g., a column offset), a pixel height, and/or a pixel width. In one example, the vector may include row and column offsets (e.g., (20, 25)) having a range (−32, 32) in the vertical direction and a range (−64, 64) in the horizontal direction. In some examples, the processor may generate one or more vectors to define the bounding region.

At block 1512, the method includes fetching image data corresponding to the bounding region of the second image frame from an external memory. The processor may use the vector to fetch the image data associated with the bounding region in the second image frame from external memory. The image data associated with the bounding region may include image data that corresponds (e.g., matches) the image data associated with the selected tiles of the first image frame. For example, the processor may fetch the image data associated with the boundary region that includes the matching image data. The processor may generate addresses based on the vector to access the external memory for transferring the image data associated with the bounding region. The addresses may indicate a number of rows and columns associated with the bounding region. As such, the processor may fetch the image data associated with the region from the external memory that includes the matching image data.

After the processor fetches the image data associated with the bounding region, the processor may store the image data in internal memory of the processor and may search the image data to identify the corresponding image data (e.g., matching patch) for each of the selected tiles of the first image frame as described above. In other embodiments, the processor may use alignment information (e.g., displacement vectors) associated with the selected tiles of the first image frame to identify the matching image data in the fetched image data. The processor may combine the image data associated with each of the selected tiles of the first image frame with the corresponding image data (e.g., matching image data) to form an output or combine image frame. The output image frame may have improved characteristics over the individual image frames of the sequence of image frames. For example, the output image frame may have a greater resolution, a higher dynamic range, a larger depth of field, less noise, a higher sharpness level, and/or less blurring than any of the individual images in the image sequence.

In some implementations, the systems of the vehicle may utilize the resulting output image frame as input to control the path of the vehicle in an environment and/or to make a determination about the location and identity of objects in the surrounding environment. For example, the vehicle system may compare a sequence of captured images with the output image frames to determine changes in positions of the vehicle. By utilizing the output image frames, the system may make estimates of the position of the vehicle that is bounded in error, from output image frame to output image frame. Further, the output image frames may be useful for a number of applications including depth estimation, three-dimensional reconstruction, refocusing, high dynamic range imaging, and the like.

Figure 16:
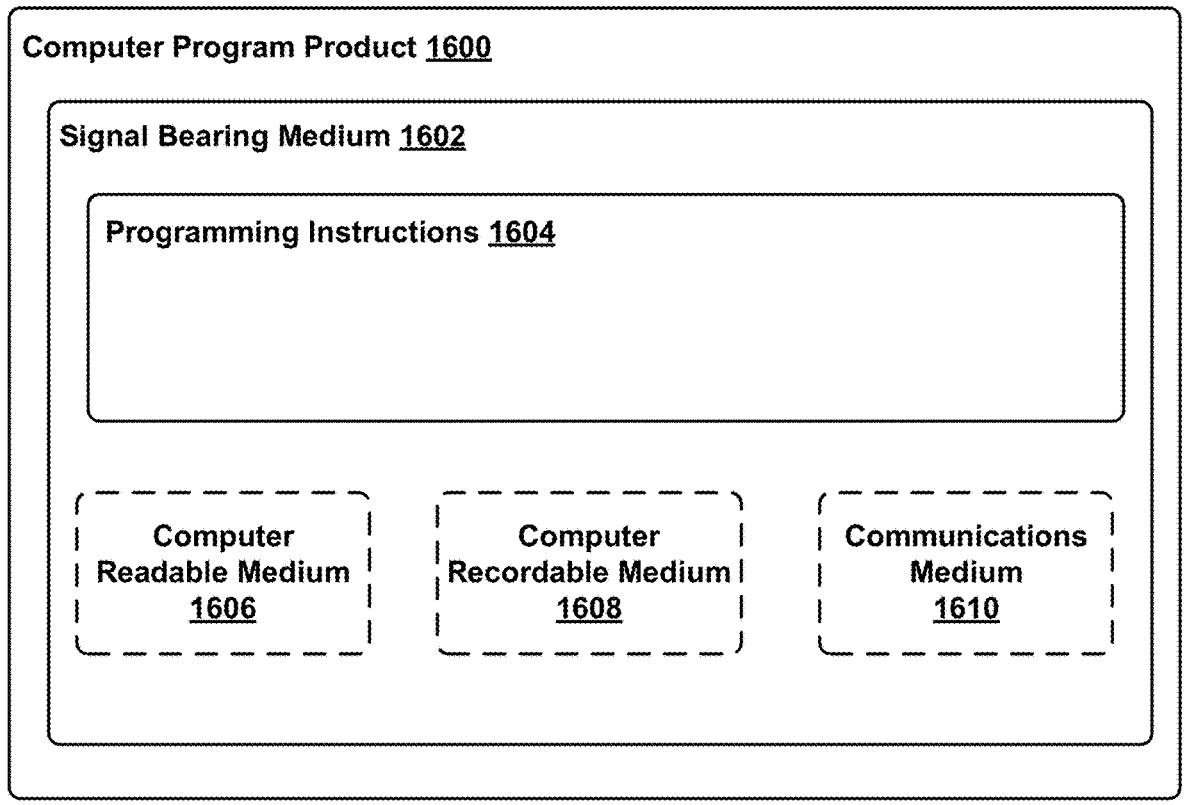
FIG. 16 is a schematic diagram of a computer program, according to an example implementation.

FIG. 16 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 1600 is provided using signal bearing medium 1602, which may include one or more programming instructions 1604 that, when executed by one or more processors may provide functionality or portions of the functionality described above with respect to FIGS. 1-4. In some examples, the signal bearing medium 1602 may encompass a non-transitory computer-readable medium 1606, such as, but not limited to, a hard disk drive, a CD, a DVD, a digital tape, memory, components to store remotely (e.g., on the cloud), etc. In some implementations, the signal bearing medium 1602 may encompass a computer recordable medium 1608, such as, but not limited to, memory, read/write (R/W) CDs, R/W DVDs, etc. In some implementations, the signal bearing medium 1602 may encompass a communications medium 1610, such as, but not limited to, a digital and/or an analog communication medium (e.g., a fiber optic cable, a waveguide, a wired communications link, a wireless communication link, etc.). Similarly, the signal bearing medium 1602 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 1602 may be conveyed by a wireless form of the communications medium 1610.

The one or more programming instructions 1604 may be, for example, computer executable and/or logic implemented instructions. In some examples, a computing device such as the computer system 112 of FIG. 1 or remote computing system 302 and perhaps server computing systems of FIG. 3 may be configured to provide various operations, functions, or actions in response to the programming instructions 1604 conveyed to the computer system 112 by one or more of the computer readable medium 1606, the computer recordable medium 1608, and/or the communications medium 1610.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, by a processor, a first image frame of a sequence of image frames from an image capture device;
selecting a first portion of the first image frame;
obtaining alignment information;
determining, by the processor, a first portion and a second portion of a second image frame based on the alignment information, wherein the alignment information includes a first displacement vector and a second displacement vector, wherein the first displacement vector represents an offset between the first portion of the second image frame and the second portion of the second image frame, and wherein the second displacement vector represents an offset between a third portion of the second image frame and a fourth portion of the second image frame;
determining, by the processor, a bounding region within the second image frame, the bounding region including at least the second portion of the second image frame; and
fetching, by the processor, image data corresponding to the bounding region of the second image frame from memory.

2. The method of claim 1, further comprising:
determining a difference between the first displacement vector and the second displacement vector; and
comparing the difference to a threshold value, wherein determining the bounding region further comprises including the fourth portion of the second image frame in the bounding region based on the comparison.

3. The method of claim 1, further comprising selecting a second portion of the first image frame, wherein determining the bounding region further comprises:
determining a smallest area containing the second portion of the second image frame and the fourth portion of the second image frame, wherein the second portion of the second image frame comprises a best matching portion for the first portion of the first image frame, and wherein the fourth portion of the second image frame comprises a best matching portion for the second portion of the first image frame.

4. The method of claim 1, further comprising:
determining a first location of the second portion within the second image frame;
determining a second location of the fourth portion within the second image frame;
determining a difference between the first location and the second location; and
comparing the difference to a threshold value, wherein determining the bounding region further comprises including the fourth portion within the second image frame in the bounding region based on the comparison.

5. The method of claim 1, wherein the second image frame precedes or follows the first image frame in the sequence of image frames, wherein the first image frame comprises a base image frame, and wherein the second image frame comprises an alternative image frame.

6. The method of claim 1, wherein the memory is external to the processor.

7. The method of claim 1, further comprising:
dividing the first image frame into a plurality of tiles;
searching the second image frame to identify one or more tile-size areas in the second image frame;
determining a difference between each of the one or more tile-size areas and the first portion of the first image frame;
comparing each difference to a threshold value to generate a matching error; and
selecting a first tile-size area from the one or more tile-size areas based on the matching error, wherein the first tile-size area corresponds to the second portion of the second image frame.

8. The method of claim 7, wherein determining the difference comprises calculating at least one of a summed absolute difference, a mean square error, a normalized cross correlation, a Lucus-Kandae based estimation, a deep learning method, a loss function, a number of significant pixels, or a combination thereof.

9. The method of claim 1, further comprising:
dividing the second image frame into a plurality of tiles, wherein the first portion of the second image frame comprises a plurality of contiguous tiles of the second image frame.

10. The method of claim 1, further comprising:
combining the second portion of the second image frame and the fourth portion of the second image frame in an output image frame.

11. The method of claim 1, wherein the bounding region is substantially rectangular.

12. A method comprising:
receiving, by a processor, a first image frame of a sequence of image frames from an image capture device;
selecting a first portion of the first image frame;
obtaining alignment information;
determining, by the processor, a first portion and a second portion of a second image frame based on the alignment information;
determining, by the processor, a bounding region within the second image frame, the bounding region including at least the second portion of the second image frame, wherein the alignment information includes a vector identifying the bounding region, wherein the vector includes a horizontal component, a vertical component, a pixel range in height, and a pixel range in width; and
fetching, by the processor, image data corresponding to the bounding region of the second image frame from memory.

13. The method of claim 12, wherein the second image frame precedes or follows the first image frame in the sequence of image frames, wherein the first image frame comprises a base image frame, and wherein the second image frame comprises an alternative image frame.

14. The method of claim 12, wherein the memory is external to the processor.

15. The method of claim 12, further comprising:
dividing the first image frame into a plurality of tiles;
searching the second image frame to identify one or more tile-size areas in the second image frame;
determining a difference between each of the one or more tile-size areas and the first portion of the first image frame;
comparing each difference to a threshold value to generate a matching error; and
selecting a first tile-size area from the one or more tile-size areas based on the matching error, wherein the first tile-size area corresponds to the second portion of the second image frame.

16. The method of claim 15, wherein determining the difference comprises calculating at least one of a summed absolute difference, a mean square error, a normalized cross correlation, a Lucus-Kandae based estimation, a deep learning method, a loss function, a number of significant pixels, or a combination thereof.

17. The method of claim 12, further comprising:
dividing the second image frame into a plurality of tiles, wherein the first portion of the second image frame comprises a plurality of contiguous tiles of the second image frame.

18. The method of claim 12, further comprising:
determining a third portion and a fourth portion of the second image frame based on the alignment information;
determining a first location of the second portion within the second image frame;
determining a second location of the fourth portion within the second image frame;
determining a difference between the first location and the second location; and
comparing the difference to a threshold value, wherein determining the bounding region further comprises including the fourth portion within the second image frame in the bounding region based on the comparison.

19. The method of claim 12, wherein determining the bounding region is based on a proximity of two or more matching portions in the second image frame, a similarity between two or more displacement vectors, predetermined ranges, or a combination thereof.

20. The method of claim 12, further comprising:
determining a third portion and a fourth portion of the second image frame based on the alignment information, wherein the bounding region includes the second portion and the fourth portion of the second image frame.

* * * * *